US011329831B2

(12) United States Patent
Traynor et al.

(10) Patent No.: US 11,329,831 B2
(45) Date of Patent: May 10, 2022

(54) PRACTICAL END-TO-END CRYPTOGRAPHIC AUTHENTICATION FOR TELEPHONY OVER VOICE CHANNELS

(71) Applicant: University of Florida Research Foundation, Incorporated, Gainesville, FL (US)

(72) Inventors: Patrick G. Traynor, Gainesville, FL (US); Bradley G. Reaves, Raleigh, NC (US); Logan E. Blue, Palm Bay, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 593 days.

(21) Appl. No.: 16/304,412

(22) PCT Filed: Jun. 8, 2017

(86) PCT No.: PCT/US2017/036527
§ 371 (c)(1),
(2) Date: Nov. 26, 2018

(87) PCT Pub. No.: WO2017/214380
PCT Pub. Date: Dec. 14, 2017

(65) Prior Publication Data

US 2021/0226803 A1 Jul. 22, 2021

Related U.S. Application Data

(60) Provisional application No. 62/347,340, filed on Jun. 8, 2016.

(51) Int. Cl.
*H04L 9/32* (2006.01)
*H04L 9/08* (2006.01)
(Continued)

(52) U.S. Cl.
CPC .......... *H04L 9/3268* (2013.01); *H04L 9/0825* (2013.01); *H04L 9/3066* (2013.01); *H04L 9/3242* (2013.01); *H04L 27/12* (2013.01)

(58) Field of Classification Search
CPC ... H04L 9/3268; H04L 9/0825; H04L 9/3066; H04L 9/3242; H04L 27/12;
(Continued)

(56) References Cited

U.S. PATENT DOCUMENTS

| | | | | |
|---|---|---|---|---|
| 6,282,295 B1 * | 8/2001 | Young | H04L 9/3218 380/30 |
| 6,324,271 B1 * | 11/2001 | Sawyer | H04M 1/67 379/142.04 |
| 7,779,250 B2 * | 8/2010 | Song | H04W 12/06 380/255 |
| 7,965,701 B1 * | 6/2011 | Toennis | H04L 63/1441 370/352 |

(Continued)

OTHER PUBLICATIONS

User acceptance of token based authentication by single sign on Authors: Sandro Wefel and Paul Molitor Jul. 2012 https://www.researchgate.net/publication/232760840_User_Acceptance_of_Token_based_Authentication_by_Single_Sign-On (Year: 2012).*

(Continued)

*Primary Examiner* — Techane Gergiso
(74) *Attorney, Agent, or Firm* — Alston & Bird LLP

(57) ABSTRACT

Methods and apparatuses for providing cryptographic authentication within a voice channel are disclosed. The methods and apparatuses can provide cryptographic authentication solely within a voice channel or can use a combination of a voice channel and another data channel. A method for providing cryptographic authentication within a voice channel can operate between telephonic systems and be suitable for operating over G.711/PCMu, AMR and SPEEX™ codecs, and suitable for operating over mobile, PSTN, and VOIP networks. The method can include providing a modem that is codec agnostic and suitable for executing a TLS-based authentication protocol. The method (Continued)

can include using frequency-shift modulation within a frequency range of 300-3400 Hz.

34 Claims, 4 Drawing Sheets

(51) Int. Cl.
*H04L 9/30* (2006.01)
*H04L 27/12* (2006.01)

(58) Field of Classification Search
CPC ... H04L 29/1216; H04L 61/157; H04L 27/10; H04M 1/573; H04M 1/576; H04M 1/578; H04M 3/42042; H04M 3/42051; H04M 3/42059; H04M 3/42068; H04M 3/42076; H04M 1/665; H04M 1/663; H04M 3/42034; H04M 3/42025; H04M 1/57; H04M 1/571; H04W 12/069; H04W 12/72; H04W 12/0431; H04W 12/12
See application file for complete search history.

(56) References Cited

U.S. PATENT DOCUMENTS

| | | | | |
|---|---|---|---|---|
| 8,270,588 | B2 * | 9/2012 | Schwartz | H04M 3/436<br>704/244 |
| 8,495,375 | B2 * | 7/2013 | Sherkin | H04L 9/0844<br>713/168 |
| 10,149,156 | B1 * | 12/2018 | Tiku | H04W 12/66 |
| 2003/0051133 | A1 * | 3/2003 | Pearson | H04L 63/0442<br>713/155 |
| 2005/0149732 | A1 | 7/2005 | Freeman et al. | |
| 2006/0095766 | A1 * | 5/2006 | Zhu | H04L 63/0869<br>713/168 |
| 2006/0187900 | A1 * | 8/2006 | Akbar | H04M 7/0066<br>370/352 |
| 2006/0274899 | A1 * | 12/2006 | Zhu | H04L 63/02<br>380/281 |
| 2008/0181380 | A1 * | 7/2008 | Gustave | H04L 63/0884<br>379/142.05 |
| 2010/0002686 | A1 * | 1/2010 | Rosenberg | H04L 65/1069<br>370/352 |
| 2010/0063895 | A1 | 3/2010 | Dominguez et al. | |
| 2010/0202616 | A1 * | 8/2010 | Peirce | H04W 4/44<br>380/270 |
| 2010/0257365 | A1 * | 10/2010 | Anchan | H04L 63/068<br>713/171 |
| 2011/0035582 | A1 * | 2/2011 | Zheng | H04L 63/12<br>713/152 |
| 2011/0305333 | A1 | 12/2011 | Jacobson et al. | |
| 2012/0204032 | A1 * | 8/2012 | Wilkins | H04L 63/0428<br>713/170 |
| 2012/0263298 | A1 | 10/2012 | Suh et al. | |
| 2013/0242858 | A1 * | 9/2013 | Amine | H04Q 3/00<br>370/328 |
| 2014/0187203 | A1 * | 7/2014 | Bombacino | H04L 63/0428<br>455/411 |
| 2015/0237201 | A1 * | 8/2015 | Feltham | H04L 9/3263<br>379/93.03 |
| 2015/0341161 | A1 | 11/2015 | Khan et al. | |
| 2017/0054770 | A1 * | 2/2017 | Wells | H04L 65/1006 |
| 2017/0236343 | A1 * | 8/2017 | Leboeuf | H04L 9/30<br>340/5.61 |
| 2018/0124604 | A1 * | 5/2018 | Rajadurai | H04L 65/1016 |

OTHER PUBLICATIONS

International Searching Authority, International Search Report for Application No. PCT/US2017/036527, dated Oct. 12, 2017, 3 pages, Korean Intellectual Property Office, Republic of Korea.

*3rd Generation Partnership Project; Technical Specification Group SA WG3; A Guide to 3rd Generation Security*. 3G TR 33.900, Version 1.2.0, Jan. 2000, (29 pages).

*3rd Generation Partnership Project; Technical Specification Group Services and System Aspects; 3G Security; Security Principles and Objectives*. 3GPP TS 33.120, Version 4.0.0, Mar. 2001, (9 pages).

*3rd Generation Partnership Project; Technical Specification Grup Services and System Aspects; IP Multimedia Subsystem (IMS)*; Stage 2, Release 11. 3GPP TS 23.228, Jun. 2012, (288 pages).

Akhawe et al., *Here's My Cert, So Trust Me, Maybe? Understanding TLS Errors on the Web*. In Proceedings of the 22nd International Conference on World Wide Web (WWW), May 13, 2013, pp. 59-70.

Akhawe et al., *Alice in Warningland: A Large-Scale Field Study of Browser Security Warning Effectiveness*. In Proceedings of the 22nd USENIX Security Symposium Conference on Security (SEC), Aug. 14, 2013, pp. 257-272.

Alegre et al., *Evasion and Obfuscation in Automatic Speaker Verification*. In Proceedings of the IEEE International Conference on Acoustics, Speech and Signal Processing (ICASSP), May 4, 2014, pp. 749-753.

Alegre et al., *On the Vulnerability of Automatic Speaker Recognition to Spoofing Attacks With Artificial Signals*. In Proceedings of the 20th European Signal Processing Conference (EUSIPCO), Aug. 2012, pp. 36-40.

Tyrberg, *Data Transmission Over Speech Coded Voice Channels*. Master's Thesis, Linkoping University, 2006, (81 pages).

Balasubramaniyan et al., *Pindr0p: Using Single-Ended Audio Features to Determine Call Provenance*. In Proceedings of the ACM Conference on Computer and Communications Security (CCS), 2010, 12 pages.

Barkan et al., *Instant Ciphertext-Only Cryptanalysis of GSM Encrypted Communication*. Journal of Cryptology, vol. 21, Issue 3, (2008), pp. 392-429.

Bates et al., *Forced Perspectives: Evaluating an SSL Trust Enhancement at Scale*. In Proceedings of the 2014 Conference on Internet Measurement Conference (IMC), ACM, (2014), pp. 503-510.

Bellare, *New Proofs for NMAC and HMAC Security Without Collision-Resistance*. Advances in Cryptology, CRYPTO '06, Aug. 20, 2006, (31 pages). Springer, Berlin, Heidelberg.

Sklar, *Digital Communications: Fundamentals and Applications*. Second Edition, Prentice Hall, Upper Saddle River, N.J, Jan. 2001, (953 pages).

Bokharaei et al., *You Can SPIT, But You Can't Hide: Spammer Identification in Telephony Networks*. In Proceedings of the IEEE Infocom, Apr. 10, 2011, pp. 41-45.

Bresciani et al., *The ZRTP Protocol Security Considerations*. Technical Report LSV-07-20, May 2007, (25 pages).

Choi et al., *An Improvement on Privacy and Authentication in GSM*. In Information Workshop on Information Security Applications (WISA), Aug. 23, 2004, pp. 14-26, Springer, Berlin, Heidelberg.

Clark et al., *SoK: SSL and HTTPS: Revisiting Past Challenges and Evaluating Certificate Trust Model Enhancements*. In Proceedings of the IEEE Symposium on Security and Privacy (S&P), May 19, 2013, pp. 511-525.

Communications Fraud Control Association (CFCA). *2013 Global Fraud Loss Survey*, (2013), 51 pages. [Retrieved from the Internet Aug. 1, 2019] <http://www.cvidya.com/media/62059/global-fraud_loss_survey2013.pdf>.

Dacosta et al., *Trust No One Else: Detecting MITM Attacks Against SSL/ TLS Without Third-Parties*. In Proceedings of the 17th European Symposium on Research in Computer Security (ESORICS), Sep. 2012, pp. 199-216, Pisa, Italy. Springer, Berlin, Heidelberg.

Dhamija et al., *Why Phishing Works*. In Proceedings of the SIGCHI Conference on Human Factors in Computing Systems (CHI), CHI '06, Apr. 22, 2006, pp. 581-590. New York, NY, USA. ACM.

Dhananjay et al., *Hermes: Data Transmission Over Unknown Voice Channels*. In Proceedings of the Sixteenth Annual International Conference on Mobile Computing and Networking, MobiCom, Sep. 20, 2010, (12 pages). New York, NY, USA. ACM.

Durumeric et al., *The Matter of Heartbleed*. In Proceedings of the 2014 Conference on Internet Measurement Conference (IMC), Nov. 5, 2014, pp. 475-488, New York, NY, USA. ACM.

(56) References Cited

OTHER PUBLICATIONS

Egelman et al., *You've Been Warned: An Empirical Study of the Effectiveness of Web Browser Phishing Warnings*. In Proceedings of the SIGCHI Conference on Human Factors in Computing Systems (CHI), Apr. 6, 2008, (10 pages). ACM.
Ellison et al., *SPKI Certificate Theory*. IETF, RFC 2693, Sep. 1999, (43 pages).
Ellison et al., *Ten Risks of PKI: What You're Not Being Told About Public Key Infrastructure*. Computer Security Journal, 16(1), Nov. 1, 2000, pp. 1-7.
Holz et al., *The SSL Landscape: A Thorough Analysis of the X.509 PKI Using Active and Passive Measurements*. In Proceedings of the 2011 ACM SIGCOMM Conference on Internet Measurement Conference (IMC), Nov. 2, 2011, pp. 427-444. ACM.
Huang et al., *Analyzing Forged SSL Certificates in the Wild*. In Proceedings of the IEEE Symposium on Security and Privacy (SP), May 18, 2014, pp. 83-97.
Jiang et al., *Isolating and Analyzing Fraud Activities in a Large Cellular Network via Voice Call Graph Analysis*. In Proceedings of the 10th International Conference on Mobile Systems, Applications, and Services (MobiSys), Jun. 25, 2012, pp. 253-266. ACM.
Jin et al., *Is Voice Transformation a Threat to Speaker Identification*? In Proceedings of the International Conference on Acoustics, Speech and Signal Processing (ICASSP), Mar. 31, 2008, pp. 4845-4848. IEEE.
Katugampala et al., *Real-Time End-To-End Secure Voice Communications Over GSM Voice Channel*. In 2005 13th European Signal Processing Conference, Sep. 4, 2005, pp. 1-4. IEEE.
Koopman et al., *Cyclic Redundancy Code (CRC) Polynomial Selection for Embedded Networks*. In 2004 International Conference on Dependable Systems and Networks, Jun. 28, 20014, pp. 145-154.
Lee et al., *Enhanced Privacy and Authentication for the Global System for Mobile Communications*. Wireless Networks, 5(4), Jul. 1, 1999, pp. 231-243.
Lepinski et al., *An Infrastructure to Support Secure Internet Routing*. IETF, RFC 6480, (2012), (24 pages).
Bresciani, *The ZRTP Protocol Analysis on the Diffie-Hellman Mode*, Computer Science Department Technical Report TCD-CS-2009-13, Trinity College Dublin, Jun. 12, 2009, (22 pages).
Local Search Association. *CLEC Information*, (2016), (2 pages). [Retrieved from the Internet Aug. 1, 2019] <http://www.the1sa.org/main/clecinformation.aspx>.
Mathieu et al., *SDRS: A Voice-Over-IP Spam Detection and Reaction System*. IEEE Security & Privacy Magazine, 6(6), Nov. 2008, pp. 52-59.
Moeller et al., *TLS Fallback Signaling Cipher Suite Value (SCSV) for Preventing Protocol Downgrade Attacks*. Internet-Draft, Internet Engineering Task Force, Apr. 2015, (8 pages).
National Institute of Standards and Technology. *NIST Special Publication 800-107 Revision 1:Recommendation for Applications Using Approved Hash Algorithms*, Aug. 2012, (25 pages). [Retrieved from the Internet Aug. 1, 2019] <https://csrc.nist.gov/publications/detail/sp/800-107/rev-1/final>.
Needham et al., *Using Encryption for Authentication in Large Networks of Computers*. Communications of the ACM, vol. 21, No. 12, Dec. 1, 1978, pp. 993-999.
Ozkan et al., *Secure Voice Communication via GSM Network*. In 2011 7th International Conference on Electrical and Electronics Engineering (ELECO), Dec. 1, 2011, pp. II-288-II-292.
Petraschek et al., *Security and Usability Aspects of Man-in-the-Middle Attacks on* ZRTP. Journal of Universal Computer Science, vol. 14, No. 5, Jan. 1, 2008, pp. 673-692.
Ramirez. *Theft Through Cellular 'Clone' Calls*. [Retrieved from the Internet Aug. 1, 2019] <http://www.nytimes.com/1992/04/07/business/theft-through-cellular-clone-calls.html>, Apr. 7, 1992, (8 pages).
Reaves et al., *Boxed Out: Blocking Cellular Interconnect Bypass Fraud at the Network Edge*. In 24th {USENIX} Security Symposium ({USENIX} Security 15) (2015), pp. 833-848.
Standards for Efficient Cryptography, Certicom Research. *SEC 2: Recommended Elliptic Curve Domain Parameters*, Jan. 27, 2010, Version 2.0, (37 pages).
Rivest et al., *SDSI: A Simple Distributed Security Infrastructure*. [Retrieved from the Internet] <http://research.microsoft.com/en-us/um/people/blampson/59-sdsi/webpage.html>. Apr. 1996, (44 pages).
Rosset et al., *Discovery of Fraud Rules for Telecommunications-Challenges and Solutions*. In Proceedings of the Fifth ACM SIGKDD International Conference on Knowledge Discovery and Data Mining (KDD), Aug. 1, 1999, pp. 409-413. ACM.
Samfat et al., *Untraceability in Mobile Networks*. In Proceedings of the 1st Annual International Conference on Mobile Computing and Networking (MobiCom), Nov. 1995, pp. 26-36.
Schechter et al., *The Emperor's New Security Indicators*. In 2007 IEEE Symposium on Security and Privacy (SP'07), May 20, 2007, pp. 51-65.
Sengar. *VoIP Fraud : Identifying a Wolf in Sheeps Clothing*. In Proceedings of the 2014 ACM SIGSAC Conference on Computer and Communications Security (CCS), Nov. 3, 2014, pp. 334-345.
Sherr et al., *Signaling Vulnerabilities in Wiretapping Systems*. IEEE Security & Privacy Magazine, vol. 3, No. 6, Nov. 2005, pp. 13-25.
Shirvanian et al., *Wiretapping via Mimicry: Short Voice Imitation Man-in-the-Middle Attacks on Crypto Phones*. In Proceedings of the 2014 ACM SIGSAC Conference on Computer and Communications Security (CCS), Nov. 3, 2014, pp. 868-879. ACM.
Sobey et al., *Exploring User Reactions to New Browser Cues for Extended Validation Certificates*. In Proceedings of the European Symposium on Research in Computer Security (ESORICS), Oct. 6, 2008, (17 pages).
Stylianou, *Voice Transformation: A Survey*. In Proceedings of the 2009 IEEE Conference on Acoustics, Speech and Signal Processing (ICASSP), Apr. 19, 2009, pp. 3585-3588.
Toorani et al., *Solutions to the GSM Security Weaknesses*. In Proceedings of the 2009 Second International Conference on Next Generation Mobile Applications, Services, and Technologies (NGMAST), Sep. 16, 2008, pp. 576-581.
Traynor et al., *Security for Telecommunications Networks*. No. 978-0-387-72441-6 in Advances in Information Security Series, Aug. 2008, (185 pages), Springer.
Wu et al., *SAS: A Speaker Verification Spoofing Database Containing Diverse Attacks*. In Proceedings of the 2015 IEEE International Conference on Acoustics, Speech and Signal Processing (ICASSP), Apr. 19, 2015, pp. 4440-4444.
Wu et al., *Voice Conversion and Spoofing Attack on Speaker Verification Systems*. In Proceedings of the 2013 Asia-Pacific Signal and Information Processing Association Annual Summit and Conference (APSIPA). Oct. 2013, (9 pages).
Zimmermann et al., *ZRTP: Media Path Key Agreement for Unicast Secure RTP*. IETF, RFC 6189, (2011), (115 pages).
Zoller. Draft—*TLS & SSLv3 Renegotiation Vulnerability Explained*, Dec. 2011, (25 pages). [Retrieved from the Internet Aug. 1, 2019] <http://www.g-sec.lu/practicaltls>.

* cited by examiner

PRACTICAL END-TO-END CRYPTOGRAPHIC AUTHENTICATION FOR TELEPHONY OVER VOICE CHANNELS

CROSS REFERENCE TO RELATED APPLICATIONS

This application is a National Stage Application, filed under 35 U.S.C. 371, of International Application No. PCT/US2017/036527, filed Jun. 8, 2017, which claims the benefit of U.S. Provisional Patent Application Ser. No. 62/347,340, filed Jun. 8, 2016, which is incorporated herein by reference in its entirety, including any figures, tables, and drawings.

GOVERNMENT SUPPORT

This invention was made with government support under Grant No. CNS1464088 awarded by the National Science Foundation. The government has certain rights in the invention.

BACKGROUND OF INVENTION

Telephones remain a trusted platform for conducting some of our most sensitive exchanges. From banking to taxes, wide swathes of industry and government rely on telephony as a secure fallback when attempting to confirm the veracity of a transaction. In spite of this, authentication is poorly managed between these systems, and in general it is impossible to be certain of the identity (i.e., Caller ID) of the entity at the other end of a call. This inability to authenticate the identity of callers results in billions of dollars lost through fraud, scamming, and identity theft.

BRIEF SUMMARY

The problems discussed above are addressed in this application with methods and apparatuses that provide cryptographic authentication within the voice channel. Embodiments of the present invention include methods and apparatuses that can provide cryptographic authentication using solely a voice channel or a voice channel in combination with another type of data channel. Embodiments of the present invention may include an in-band modem for executing a TLS-inspired authentication protocol, and demonstrate that explicit single-sided authentication procedures pervading the web are possible on all phones. Embodiment of the present invention may execute cryptographic authentication with minimal computational overhead and only a few seconds of user time (e.g., about 9 seconds instead of ~97 seconds for a naive implementation of TLS 1.2) over heterogeneous networks. In addition, embodiments demonstrate that strong end-to-end validation of Caller ID is practical for all telephony networks.

Embodiments of the present invention can be incorporated in products including, but not limited to, software on mobile phones, hardware in baseband chipsets, and call-center management equipment. Embodiments of the present invention can provide strong cryptographic authentication for phone calls, regardless of the network over which the phone operates. Accordingly, use of embodiments of the present invention can result in a dramatic reduction in financial fraud, robo-calling, and related problems. No other current technology is known to provide such advantages.

Embodiments of the present invention include methods and apparatuses for providing cryptographic authentication solely within a voice channel. A method according to an embodiment of the present invention can operate between telephonic systems and can be suitable for operating over G.711/PCMu, AMR, and SPEEX™ codecs; and can be suitable for operating over mobile, PSTN, and VOIP networks. Embodiments can further include providing a modem that is codec agnostic, suitable for executing a TLS-based authentication protocol, uses frequency-shift modulation, and operates within a frequency range of 300-3400 Hz. The modem use decoherent modulation, with chosen frequencies that are separated by at least the symbol transmission rate, and operate with each frequency being an integer multiple of a symbol frequency. Embodiments may provide end-to-end validation of Caller ID, and provide authentication of a Prover and a Verifier. Embodiments can create a data channel with a goodput of 500 bits per second (bps) or more and a bit error rate averaging below 0.5%. A method according to an embodiment can be run below speaker audio such that it does not interfere with call participant conversations.

Embodiments of the present can include a telephonic apparatus that is suitable for providing cryptographic authentication solely within a voice channel. In some embodiments, an apparatus can provide cryptographic authentication by using a combination of the voice channel and a traditional data channel. The apparatus can include a codec agnostic modem that is suitable for data transmission across audio channels. The apparatus can be suitable for operating over G.711/PCMu, AMR, and SPEEX™ codes; and be suitable for operating over mobile, PSTN, and VOIP networks. Embodiments can operate using TLS-based authentication protocol and frequency-shift modulation within a frequency range of 300-3400 Hz. The apparatus can provide end-to-end validation of Caller ID and be suitable creating a data channel with a goodput of 500 bps or more and a bit error rate averaging below 0.5%.

DETAILED DISCLOSURE

Figure 1:
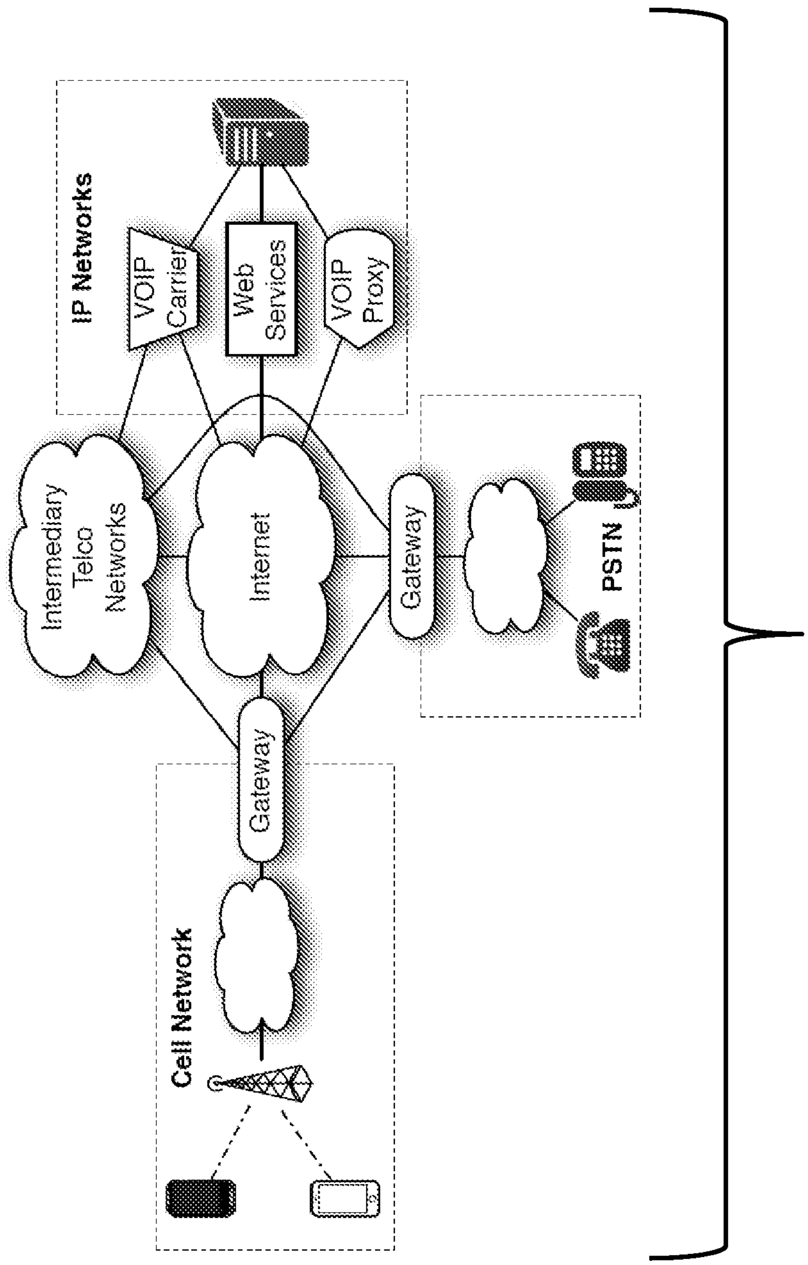
FIG. 1 is a diagram showing a high level overview of the modern telephony ecosystem.

Modern telephony systems include a wide array of end user devices. From traditional rotary public switch telephone network (PSTN) phones to modern cellular and voice over internet protocol (VoIP) capable systems, these devices remain the de facto trusted platform for conducting many of our most sensitive operations. Even more critically, these systems offer the sole reliable connection for the majority of people in the world today.

Such trust is not necessarily well placed. Caller ID is known to be a poor authenticator, and is successfully exploited to enable over US$2 billion in fraud every year. Many scammers simply block their phone number and exploit trusting users by asserting an identity (e.g., a bank, law enforcement, etc.), taking advantage of a lack of reliable cues and mechanisms to dispute such claims. The Web experienced very similar problems in the 1990s, and developed and deployed the Transport Layer Security (TLS) protocol suite and necessary support infrastructure to assist with the integration of more verifiable identity in communications. While by no means perfect and still an area of active research, this infrastructure helps to make a huge range of attacks substantially more difficult. Unfortunately, the lack of similarly strong mechanisms in telephony means that not even trained security experts can currently reason about the identity of other callers.

Embodiments of the present invention provide a strong cryptographic authentication protocol. However, unlike other related solutions that assume Internet access, accessibility to a secondary and concurrent data channel is not a guarantee in many locations (e.g., high density cities, rural areas), nor for all devices, mandating that a solution to this problem be network agnostic. Accordingly, embodiments of the present invention can be designed to transmit over the only channel certain to be available to all phone systems—audio. By implementing an embodiment of the present invention, users can quickly and strongly identify callers who may fraudulently be claiming to be organizations such as financial institutions and government.

Embodiments of the subject invention provide the following contributions:

- Design of a Complete Transmission Layer: A first codec agnostic modem is disclosed that allows for the transmission of data across audio channels. A supporting Layer 2 protocol can then be created to enable the reliable delivery of data across the heterogeneous landscape of telephony networks.
- Design of an Authentication Protocol: After characterizing the bandwidth limitations of the data channels, a protocol can be designed to provide explicit authentication of one party (i.e., the "Prover") and optionally weak authentication of the second party (i.e., the "Verifier").
- Evaluation of the Performance of a Reference Implementation: Experimental embodiments of the present invention are implemented and tested using three representative codecs—G.711/PCMu (for PSTN networks), AMR (for cellular networks) and SPEEX™ (for VoIP networks). The experimental embodiments demonstrate the ability to create a data channel with a goodput of 500 bit per second (bps) and bit error rates averaging below 0.5%. An authentication protocol according to an embodiment of the present invention can be run over this channel in an average of 9 seconds (which can be played below speaker audio), compared to running a direct port of TLS 1.2 in an average of 97 seconds (a 90% reduction in running time).

The landscape of modern telephony is complex and heterogeneous. Subscribers can receive service from mobile, PSTN, and VoIP networks, and calls to those subscribers may similarly originate from networks implementing any of the above technologies. FIG. 1 provides a high-level overview of the modern telephony ecosystem. In addition to voice being transcoded at each gateway, all identity mechanisms become asserted rather than attested as calls cross network borders.

Figure 2A:
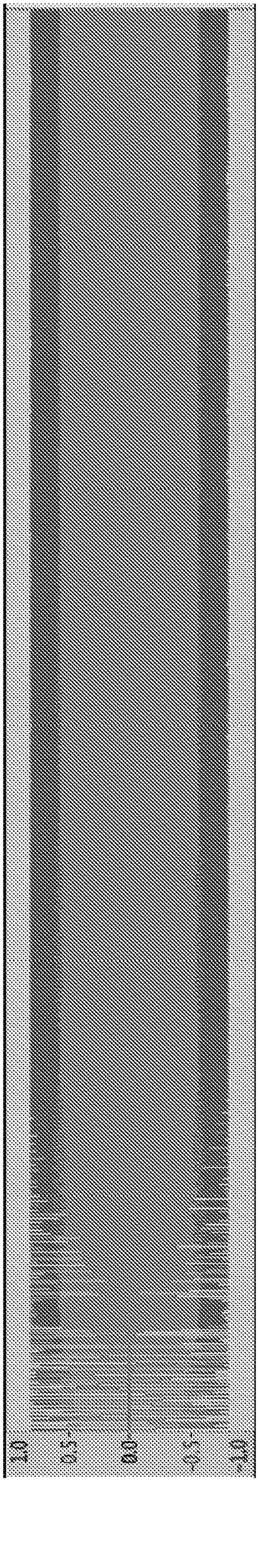
FIG. 2A shows a sweep of an audio signal from 300 to 3300 Hz across 1 second before being encoded with an AMR codec.
Figure 2B:
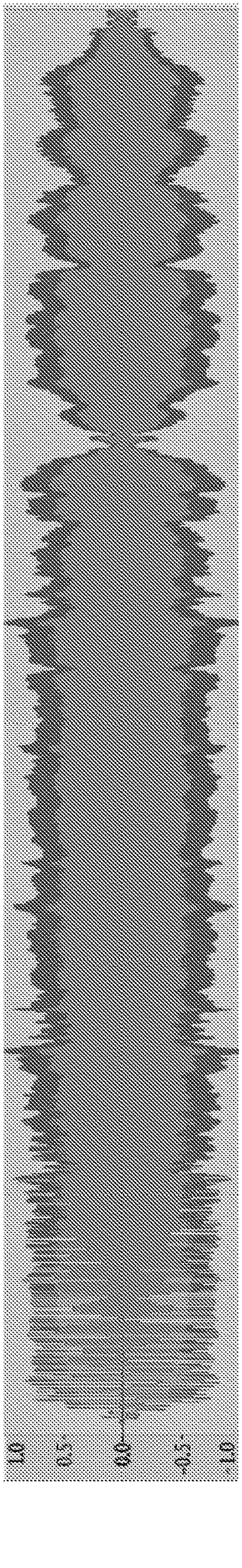
FIG. 2B shows a sweep of the audio signal of FIG. 2A after being encoded with the AMR codec.

While performing similar high-level functionality (i.e., enabling voice calls), each of these networks is built on a range of often incompatible technologies. From circuit-switched intelligent network cores to packet switching over the public Internet, very little information beyond the voice signal actually propagates across the borders of these systems. In fact, because many of these networks rely on different codecs for encoding voice, one of the major duties of gateways between these systems is the transcoding of audio. Accordingly, voice encoded at one end of a phone call is unlikely to have the same (or even similar) bitwise representation when it arrives at the client side of the call. To this point, FIG. 2A shows a sweep of an audio signal from 300 to 3300 Hz (all within the acceptable band) across 1 second. The bottom plot shows the same signal after it is has been encoded using the Adaptive Multi-Rate (AMR) audio codec used in cellular networks, resulting in a dramatically different message. This massive difference is a result of the voice-optimized audio codecs used in different telephony networks. Accordingly, successfully performing end-to-end authentication requires careful design for this non-traditional data channel.

One of the few pieces of digital information that can be optionally passed between networks is the Caller ID. Unfortunately, the security value of this metadata is minimal because it is asserted by the source device or network, but never validated by the terminating or intermediary networks. As such, an adversary is able to claim any phone number (and therefore identity) as its own with ease. This process requires little technical sophistication, can be achieved with the assistance of a wide range of software and services and is the enabler of greater than US$2 billion in fraud annually.

Authentication has been the chief security concern of phone networks since their inception because of its strong ties to billing. Little effort was taken for authentication in traditional landline networks as detecting billable activity on a physical link limited the scalability of attacks. First generation (1G) cellular systems were the first to consider such mechanisms given the multiuser nature of the wireless spectrum. Unfortunately, 1G authentication relied solely on the plaintext assertion of each user's identity and was therefore subject to significant fraud. Second generation (2G) networks (e.g., GSM) designed cryptographic mechanisms for authenticating users to the network. These protocols failed to authenticate the network to the user and lead to a range of attacks against subscribers. Third and fourth generation (3G and 4G) systems correctly implement mutual authentication between the users and providers. Unfortunately, all such mechanisms are designed to allow accurate billing, and do little to help users identify other callers.

While a number of seemingly-cellular mechanisms have emerged to provide authentication between end users, these systems ultimately rely on a data/Internet connection to work, and are themselves vulnerable to a number of attacks. Accordingly, there remains no end-to-end solution for authentication across voice networks (i.e., authentication with any non-VoIP phone is not possible).

Mechanisms to deal with such attacks have had limited success. Websites have emerged with reputation data for unknown callers; however, these sites offer no protection against Caller-ID spoofing, and users generally access such information after such a call has occurred. Others have designed heuristic approaches around black lists, speaker recognition, channel characterization, post hoc call data records, and timing. Unfortunately, the fuzzy nature of these mechanisms may cause them to fail under a range of common conditions including congestion and evasion.

Authentication between entities on the Internet generally relies on the use of strong cryptographic mechanisms. The SSL/TLS suite of protocols are by far the most widely used, and help provide attestable identity for applications as diverse as web browsing, email, instant messaging and more. SSL/TLS are not without their own issues, including a range of vulnerabilities across different versions and implementations of the protocols, weaknesses in the model and deployment of Certificate Authorities, and usability. Regardless of these challenges, these mechanisms provide more robust means to reason about identity than the approaches used in telephony.

Telephony can build on the success of SSL/TLS. However, these mechanisms cannot simply be built on top of current telephony systems. Instead, as will be demonstrated, codec-aware protocols that are optimized for the limited bitrate and higher loss of telephony systems must be designed.

To provide end-to-end authentication across any telephone networks, a way to transfer data over the voice channel is needed. This application will detail the challenges that need to be addressed, how a modem that provides a base data rate of 500 bps was implemented, and how a link layer to address channel errors was developed.

Readers may remember dial-up Internet access and a time when data transmission over voice channels was a common occurrence. In the heyday of telephone modems, though, most voice channels were connected over high-fidelity analog twisted pairs. Although the voice channel was band limited and digital trunks used a low sample rate of 8 kHz, the channel was quite well behaved from a digital communications and signal processing perspective.

In the last two decades, telephony has been transformed. Cellular voice and Internet telephony now comprise a majority of all voice communications; they are not just ubiquitous, they are unavoidable. While beneficial from a number of perspectives, one of the drawbacks is that both of these modalities rely on heavily compressed audio transmission to save bandwidth. These compression algorithms—audio codecs—are technological feats, as they have permitted cheap, acceptable quality phone calls, especially given that they were developed during eras when computation was expensive. To do this, codec designers employed a number of technical and psychoacoustic tricks to produce acceptable audio to a human ear, and these tricks resulted in a channel poorly suited for (if not hostile to) the transmission of digital data. As a result, existing voice modems are completely unsuited for data transmission in cellular or VoIP networks.

The problems voice codecs present to a general purpose modem are several. First, amplitudes are not well preserved by voice codecs. This makes many common modulation schemes, including ASK, QAM, TCM, and PCM, difficult to apply. Second, phase dis-continuities are rare in speech, and are not effective in transmitting data through popular voice codecs. This discounts PSK, QPSK, and other modulation schemes that rely on correct phase information. Furthermore, many codecs lose phase information on encoding/decoding audio, preventing the use of efficient demodulators that require correct phases (i.e., coherent demodulators). Because of the problems with amplitude and phase modulation, frequency-shift modulation is suggested as the most effective technique for transmitting data through voice codecs. Even so, many codecs fail to accurately reproduce input frequencies—even those well within telephone voice-bands (300-3400 Hz). The physical layer protocol disclosed in this application addresses these challenges.

The modem disclosed in this application has three goals: support the highest bitrate possible, at the lowest error rate possible, in the presence of deforming codecs. Most modems are designed around the concept of modulating one or more parameters—amplitude, frequency, and/or phase—of one or more sine waves. The modem disclosed in this application, according to an embodiment of the present invention, can modulate a single sine wave using one of three discrete frequencies (i.e., it is a frequency shift key, or FSK, modem). The selection of these frequencies is a key consideration.

First, the modem must work with phone systems, so the choice of frequencies is limited to the 300-3400 Hz range because most landline and cellular phones are limited to those frequencies. Second, because phase information for demodulation cannot be accurately recovered, the demodulation should be decoherent; the consequence is that the chosen frequencies must be separated by at least the symbol transmission rate. Third, each frequency should be an integer multiple of the symbol frequency. This ensures that each symbol completes a full cycle, and it also ensures that each cycle begins and ends on a symbol boundary. This produces a continuous phase modulation, and is helpful because some voice codecs will produce artifacts or aliased frequencies in the presence of phase discontinuities. Embodiments can utilize a 3-FSK system transmitting symbols at 1000 Hz using frequencies of 1000, 2000, and 3000 Hz, for example.

Unfortunately, 3-FSK may be difficult to perform (and may fail) in many compressed channels simply because those channels distort frequencies, especially frequencies that change rapidly. To mitigate issues with FSK, differential modulation can be used where bits are encoded not as individual symbols, but by the relative difference between two consecutive symbols. For example, a “1” may be represented by an increase in two consecutive frequencies, while a “0” may be represented by a frequency decrease. Because only 3 frequencies are available for some embodiments, this limits the number of possible consecutive increases or decreases to 2. Manchester encoding, where each bit is expanded into two “half-bits” (e.g., a “1” is represented by “10”, and “0” represented by “01”) limits the consecutive increases or decreases within the limit.

While these details cover the transmission of data, there are a few practical concerns that must be dealt with. Many audio codecs truncate the first few milliseconds of audio. In speech this is unnoticeable, and simplifies the encoding. However, if the truncated audio carries data, several bits will be lost every transmission. This effect is compounded if voice activity detection (VAD) is used (as is typical in VoIP and cellular networks). VAD distinguishes between audio and silence, and when no audio is recorded in a call VAD indicates that no data should be sent, saving bandwidth. However, VAD adds an additional delay before voice is transmitted again.

Figure 3:
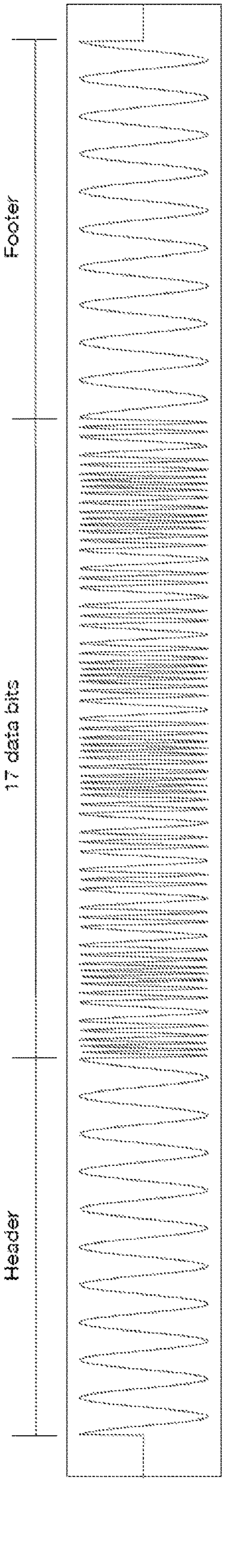
FIG. 3 is a 74 ms full modem transmission of a single frame, containing 17 bits, and demonstrates how data is modulated and wrapped in headers and footers for synchronization according to an embodiment of the present invention.

To deal with early voice clipping by codecs and VAD, some embodiments of the present invention add a header and footer (e.g., 20 milliseconds) at the end of each packet. This header can be a 500 Hz sine wave; this synchronization frequency is suggested because it is orthogonal to the other 3 transmission frequencies, and is half the symbol rate, meaning it can be used to synchronize the receiver before data arrives. A full modem transmission containing 17 bits of random data can be seen in FIG. 3.

To demodulate data, the data being transmitted must first be detected. Silence and transmission can be distinguished by computing the energy of the incoming signal using a short sliding window (i.e., the short-time energy). Then, the header and footer of a message can be located at the beginning and end of a data transmission. Finally, the average instantaneous frequency for each half-bit can be computed and the differences between each bit are computed. In some embodiments, an increase in frequency indicates 1, and a decrease indicates 0.

Despite a carefully designed modem, reception errors will still occur. These are artifacts created by line noise, the channel codec, or an underlying channel loss (e.g., a lost IP packet). To address these issues, a link layer can be used to ensure reliable transmission of handshake messages. This link layer can manage error detection, error correction, frame acknowledgement, retransmission, and reassembly of fragmented messages.

Because error rates can sometimes be as high as several percent, a robust retransmission scheme is needed. However, because the available modem data rate is so low, overhead must be kept to a minimum. This excludes most standard transmission schemes that rely on explicit sequence numbers. Instead, embodiments of the present invention suggest a data link layer that chunks transmitted frames into small individual blocks that can be checked and retransmitted if lost. This scheme will now be described.

Most link layers are designed to transmit large (up to 12,144 bits for Ethernet) frames, and these channels either use large (e.g., 32-bit) cyclic redundancy checks (CRCs) for error detection to retransmit the entire frame, or use expensive but necessary error correcting schemes in lossy media like radio. A Cyclic Redundancy Check (CRC) is a common checksum that is formed by representing the data as a polynomial and computing the remainder of polynomial division. The polynomial divisor is a design parameter that must be chosen carefully.

Error correcting codes recover damaged data by transmitting highly redundant data, often inflating the data transmitted by 100% or more. The alternative, sending large frames with a single CRC, is unlikely to be suitable for this application. To see why, note that:

$$P(\text{CorrectCRC})=(1-P(\text{biterror}))^{CRClength} \quad (1)$$

For a 3% bit error rate, the probability of just the CRC being undamaged is less than 38%—meaning two thirds of packets will be dropped for having a bad CRC independent of other errors. Even at lower loss rates, retransmitting whole frames for a single error would create massive overhead.

Instead, this application suggests dividing each frame into "blocks" (e.g., 32-bit blocks). Each block can include a number of bits for data and the remainder for a CRC. For example, each block can carry 29 bits of data and a 3-bit CRC. This allows short sections of data to be checked for errors individually and retransmitted, which is closer to optimal transmission. The block and CRC selections suggested are not arbitrary, but rather the result of careful modeling and analysis. In particular, the aim was to find an optimal tradeoff between overhead (i.e., CRC length) and error detection. Intuitively, longer CRCs provide better error detection and reduce the probability of an undetected error. More formally, a CRC of length 1 can guarantee detection of up to HD bit errors in a B-length block of data, and can detect more than HD errors probabilistically. However, it should be noted that although specific block and CRC bit lengths have been suggested, embodiments of the present invention can operate using various different combinations of block and CRC bit lengths.

The tradeoff is maximizing the block size and minimizing the CRC length while minimizing the probability of a loss in the frame or the probability of an undetected error. This is represented by the following equations:

$$Pr(\text{lost frame}) = 1 - Pr(\text{successful frame}) = 1 - (1-p)^B \quad (2)$$

$$Pr\begin{pmatrix}\text{undetected}\\ \text{error}\end{pmatrix} = 1 - \sum_{i=0}^{HD}\binom{B}{i}p^i(1-p)^{B-i} \quad (3)$$

where p represents the probability of a single bit error. The probability of undetected error is derived from the cumulative binomial distribution. Using these equations and the common bit error rate of 0.3% (measured in Section 6), a 32-bit blocks with a 3-bit CRC is suggested to be a good compromise between error correction and data transmission. These parameters give a likelihood of undetected error of roughly 2 in 10,000, which will rarely affect a regular user. Even a call center user would see a protocol failure due to bit error only once every two weeks, assuming 100 calls per day.

Figure 4:
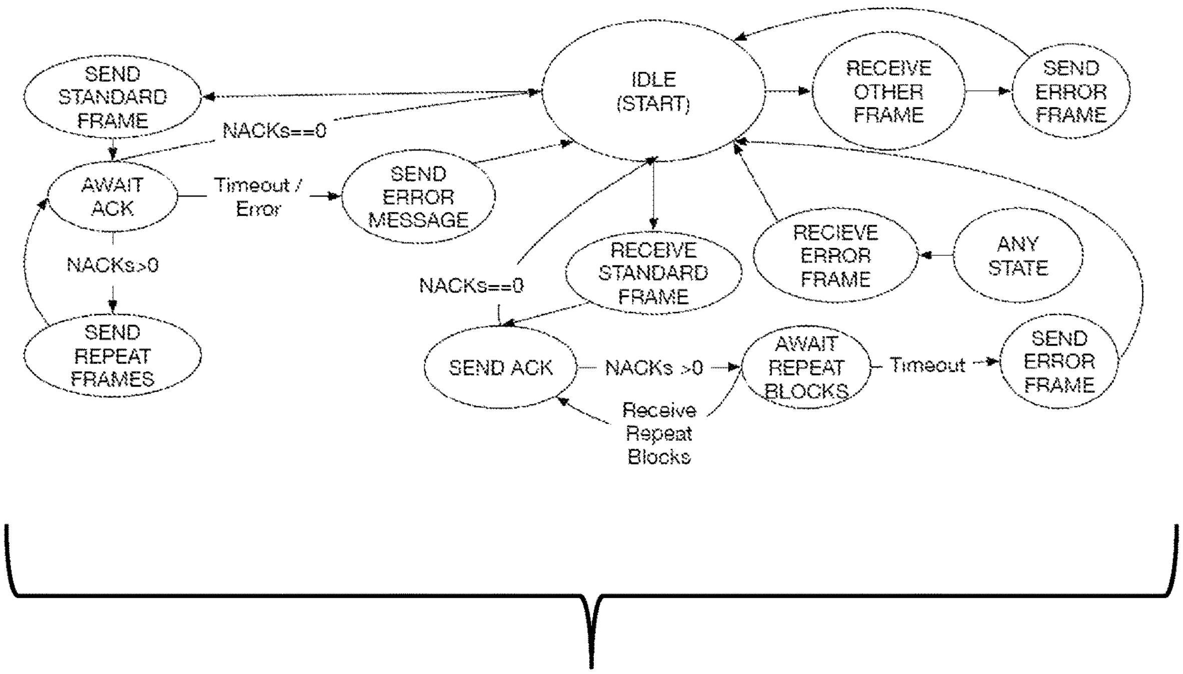
FIG. 4 is a flowchart of a Link Layer State Machine describing the error recovery process according to an embodiment of the present invention.

Error detection is only the first step of the error recovery process, which is reflected as a state machine in FIG. 4. When a message frame is received, the receiver can compute which blocks have an error and send an acknowledgement frame ("ACK") to the transmitter. The ACK frame can contain a single bit (or possibly more than one bit) for each block transmitted to indicate whether the block was received successfully. Blocks that were negatively acknowledged can be retransmitted. The retransmission can also be acknowledged by the receiver. This process can continue until all original blocks are received successfully.

By using a single bit of acknowledgement for each block, the overhead of using sequence numbers is saved. However, even a single bit error in an ACK will completely desynchronize the reassembly of correctly received data. Having meta-ACK and ACK retransmission frames would be unwieldy and inelegant.

TABLE 1

TLS Handshake Sizes

| Site Name | Total Bits | Transmission Time (seconds at 500 bps) |
|---|---|---|
| Facebook | 41 544 | 83.088 |
| Google | 42 856 | 85.712 |
| Bank of America | 53 144 | 106.288 |
| Yahoo | 57 920 | 115.840 |
| Average | 48 688 | 97.732 |

Instead, in some embodiments, redundant ACK data is transmitted as a form of error correction. For example, ACK data can be sent 3 times in a single frame and take the majority of any bits that conflict. The likelihood of a damaged ACK is then:

$$\text{Block Count}\times 3\times Pr(\text{biterr})^2 \quad (4)$$

instead of $$1-(1-Pr(\text{biterr}))^{Block\ Count} \quad (5)$$

Some embodiments of the present invention have distinct types of frames—original data, ACK data, retransmission data, and error frames. A header (e.g., a 4-bit header) may be used to distinguish these frames. Similar to the ACK data, redundant copies of the header (e.g., 3 copies) may be sent to ensure accurate recovery.

With a modem and link layer design established, how a standard authentication scheme—TLS 1.2—would fare over a voice channel can be examined.

Table 1 shows the amount of data in the TLS handshakes of four popular Internet services. These handshakes require from 41,000 to almost 58,000 bits to transmit—and this excludes application data and overhead from the TCP/IP and link layers. At 500 bits per second (the nominal speed of the modem), these transfers would require 83-116 seconds as a lower bound. From a usability standpoint, standard TLS handshakes are simply not practical for voice channels. Accordingly, a more efficient authentication protocol is needed.

Having demonstrated that data communication is possible but extremely limited via voice channels, a security model must be defined. The combination of the modem and this model can then be used to carefully design a protocol to be used in embodiments of the present invention.

One goal of the present invention is to mitigate the most common enabler of phone fraud—claiming a false identity via Caller ID spoofing. This attack generally takes the form of the adversary calling the victim user and extracting sensitive information via social engineering. The attack could also be conducted by sending the victim a malicious phone number to call (e.g., via a spam text or email). An adversary may also attempt to perform a man in the middle attack, calling both the victim user and a legitimate institution and then hanging up the call on either when they wish to impersonate that participant. Finally, an adversary may attempt to perform a call forwarding attack, ensuring that correctly dialed numbers are redirected (undetected to the caller) to a malicious endpoint.

Embodiments of the present invention were inspired by the following assumptions. An adversary is able to originate phone calls from any telephony device (i.e., cellular, PSTN, or VoIP) and spoof their Caller ID information to mimic any phone number of their choosing. Targeted devices will either display this spoofed number or, if they contain a directory (e.g., contact database on a mobile phone), a name associated or registered with that number (e.g., a Bank). The adversary can play arbitrary sounds over the audio channel, and may deliver either an automated message or interact directly with the targeted user. Last, the adversary may use advanced telephony features such as three-way calling to connect and disconnect parties arbitrarily. This model describes the majority of adversaries committing Caller ID fraud at the time of this application.

The discussed scenarios contain two classes of participants, a Verifier (i.e., the user) and Prover (i.e., either the attacker or the legitimate identity owner). The adversary is active and will attempt to assert an arbitrary identity. As is common on the Web, it is assumed that Provers have certificates issued by their service provider containing their public key and that Verifiers may have weak credentials (e.g., account numbers, PINs, etc.) but not certificates. Some embodiments of the present invention seek to achieve the following security goals in the presence of this adversary: (G1) Authentication of Prover—The Verifier should be able to explicitly determine the validity of an asserted Caller ID and the identity of the Prover without access to a secondary data channel; and (G2) Proof of Liveness—The Prover and Verifier will be asked to demonstrate that they remain on the call throughout its duration.

As discussed previously, the path between two telephony participants is likely to include a range of codec transformations, making the bitwise representation of voice vary significantly between source and destination. Accordingly, end-to-end encryption of voice content is difficult given the relatively low channel bitrate and large impact of transcoding. Some commercially available products are able to achieve this strictly because they are VoIP clients that traverse only data networks and therefore do not experience transcoding. However, as will be discussed, the techniques disclosed in this application enable the creation of a low-bandwidth channel that can be used to protect the confidentiality and integrity of client authentication credentials.

The considerations in designing the authentication protocol of the embodiments of the present invention will be briefly described. As previously mentioned, a fully-fledged Public Key Infrastructure does not exist, meaning that Verifiers (i.e., end users) do not universally possess strong credentials. Moreover, due to the protocol being limited to transmission over the audio channel, it must be highly bandwidth efficient.

One choice for a protocol for embodiments of the present invention would be to reuse an authentication protocol such as Needham-Schroeder. Reusing well-understood security protocols has great value. However, Needham-Schroeder is inappropriate at the present time because it assumes that both sides have public/private keypairs or can communicate with a third party for session key establishment. Goal G1 is therefore not practically achievable in real telephony systems. This protocol is also unsuitable as it does not establish session keys, meaning that achieving G2 would require frequent re-execution of the entire authentication protocol, which is likely to be highly inefficient.

TLS can achieve goals G1 and G2, and already does so for a wide range of traditional applications on the Web. Unfortunately, the handshaking and negotiation phases of TLS 1.2 require significant bandwidth. As previously discussed, unmodified use of this protocol can require an average of 97 seconds before authentication can be completed. However, because it can achieve goals G1 and G2, TLS 1.2 is useful as a template for the proposed protocol, and what could be considered a highly optimized version will be discussed below. It should also be noted that while TLS 1.3 provides great promise for reducing handshaking costs, the current draft version requires more bandwidth than the protocol suggested in this application.

Figure 5:
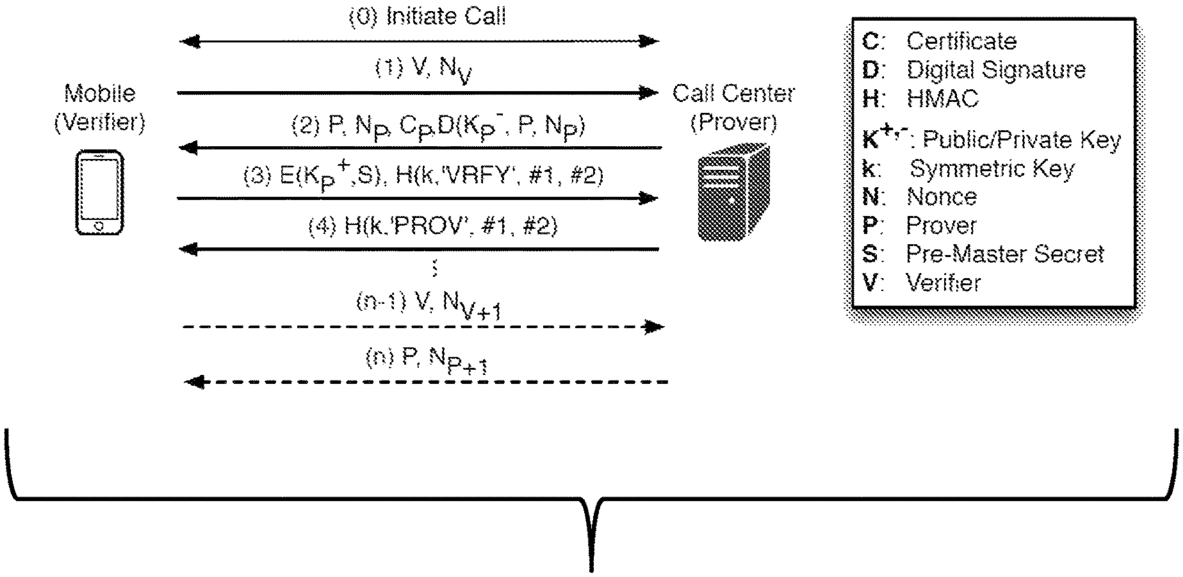
FIG. 5 is a diagram of an authentication protocol according to an embodiment of the present invention.

FIG. 5 demonstrates an authentication protocol according to an embodiment of the subject invention. Referring to FIG. 5, solid arrows indicate the initial handshake message flows, and dotted arrows indicate subsequent authenticated "keep alive" messages. The #1 and #2 in messages 3 and 4 indicate that that the contents of messages 1 and 2 are included in the calculation of the HMAC, as is done in TLS 1.2. A protocol according to an embodiment of the present invention is described below, and details about its implementation and parameterization (e.g., algorithm selection) are provided.

A protocol according to an embodiment of the present invention begins immediately after a call is terminated (the telephony term for "delivered to its intended destination") and signifies the beginning of a call, not its end. Either party, the Prover P (e.g., a call center) or the Verifier V (e.g., the end user) can initiate the call. V then transmits its identity (i.e., phone number) and a nonce NV to P. Upon receiving this message, P transmits a nonce NP and its certificate CP, and signs the contents of the message to bind the nonce to its identity. Its identity, P, is transmitted via Caller ID and is also present in the certificate.

V then generates a pre-master secret S, and uses S to generate a session key k, which is the result of HMAC(S, $N_A$, $N_B$). V then extracts P's public key from the certificate, encrypts S using that key and then computes HMAC(k, 'VRFY'; #1; #2), where 'VRFY' is a literal string, and #1 and #2 represent the contents of messages 1 and 2. V then sends S and the HMAC to P. P decrypts the pre-master secret and uses it to similarly calculate k, after which it calculates HMAC(k; 0 PROVO; #1; #2), which it then returns to V.

At this time, P has demonstrated knowledge of the private key associated with the public key included in its certificate, thereby authenticating the asserted identity. If the Prover does not provide the correct response, its claim of the Caller ID as its identity is rejected. Security goal G1 is therefore achieved. Moreover, P and V now share a session key k, which can be subsequently used to provide continued and efficient proofs (i.e., HMACs over incrementing nonces) that they remain on the call, thereby achieving Goal G2.

The session key generation step between messages 2 and 3 can be extended to provide keys for protecting confidentiality and integrity (as is done in most TLS sessions). While these keys are not of value for voice communications (given the narrow bitrate of our channel), they can be used to protect client authentication credentials. This is discussed further, below.

The proposed protocol suggests that it is secure merely via inspection. However, to provide stronger guarantees, PROVERIF™ v1.93 [24] automatic cryptographic protocol verifier was used to assure the security of the proposed handshake protocol for use in embodiments of the present invention. PROVERIF™ requires that protocols be rewritten as Horn clauses and modeled in Pi Calculus, from which it can then reason about secrecy and authentication in the Dolev-Yao setting. The protocol suggested for use in some embodiments of the present invention was represented by a total of 60 lines of code, and PROVERIF™ verified the secrecy of the session key k.

Table 2 provides an accounting of every bit used in the proposed protocol for each message. Given the tight constraints on the channel, the following parameters and considerations were used to implement the proposed protocol as efficiently as possible while still providing strong security guarantees.

An elliptic curve cryptography was used for public key primitives. The PYELLIPTIC™ library for PYTHON™ was also used, which is a PYTHON™ wrapper around OPENSSL™. Keys were generated on curve sect283r1, and keys on this curve provide security equivalent to RSA 3456. For keyed hashes, SHA-256 can be used as the underlying hash function for HMACs. To reduce transmission time, the full 256-bit HMAC was computed and the result truncated to 80 bits.

TABLE 2

Message Sizes

| Message Field | Size(Bits) |
| --- | --- |
| Verifier Hello | 144 |
| Nonce | 96 |
| Cert Ident Number | 40 |
| Protocol Command | 8 |
| Prover Hello | 1692 |
| Nonce | 96 |
| Certificate (optional) | 1592 |
| Protocol Command | 8 |
| Verifier Challenge | 1312 |
| Encrypted Premaster Secret | 1224 |

TABLE 2-continued

Message Sizes

| Message Field | Size(Bits) |
| --- | --- |
| HMAC | 80 |
| Protocol Command | 8 |
| Prover Response | 88 |
| HMAC | 80 |
| Protocol Command | 8 |
| Total With Certificate | 3236 |
| Total Without Certificate | 1648 |

Because the security factor of HMAC is dependent almost entirely on the length of the hash, this truncation maintains a security factor of $2^{-80}$. This security factor is a commonly accepted safe value for the near future, and as data transmission for the embodiments of the present invention continues to be perfected, the security factor can increase as well.

While similar to TLS 1.2, a few important changes can be made to reduce overhead. For instance, a cipher suite negotiation may not be performed in every session and instead the default use of AES256 GCM and SHA256 may be assumed. The L2 header can contain a bit field indicating whether negotiation is necessary; however, it is suggested that starting with strong defaults and negotiating in the rare scenario that it is necessary may be critical to saving bandwidth for the proposed protocol. Similarly, additional optional information (e.g., compression types supported) and the rigid TLS Record format may be excluded to ensure that overhead is minimized.

The contents of certificates can also be limited. The proposed certificates include a protocol version, the prover's phone number, claimed identification (i.e., a name), validity period, unique certificate identification number, the certificate owner's elliptic curve cryptography (ECC) public key, and a signature. Because certificate transmission comprises nearly half of the total transmission time, two variants of the proposed protocol are suggested: the standard handshake and a version with a verifier-cached certificate. Certificate caching enables a significantly abbreviated handshake. For certificate caching, a 16-bit certificate identifier can be included that the verifier sends to the prover to identify which certificate is cached. Limiting transmitted certificate chain size to a single certificate is discussed below.

TABLE 3

Bit Error Rates

| Codec | Average Bit Error | Std. Dev |
| --- | --- | --- |
| G.711 | 0.0% | 0.0% |
| AMR-NB | 0.3% | 0.2% |
| Speex | 0.5% | 5% |

TABLE 4

Link Layer Transmission of 2000 bits

| Bit Error Rate | Transmission Time | Goodput |
| --- | --- | --- |
| 0.1% | 4.086 s (0.004) | 490 bps |
| 1% | 6.130 s (0.009) | 326 bps |
| 2% | 11.652 s (0.007) | 172 bps |

The most security-sensitive parameters can be kept as defined in the TLS specification, including recommended sizes for nonces (96 bits). While the proposed protocol implementation significantly reduces the overhead compared to TLS 1.2 for this application, there is still room for improvement. In particular, the proposed encrypted premaster secret requires 1224 bits for a (TODO)-bit plaintext premaster secret. This expansion is due to the fact that while RSA has a simple primitive for direct encryption of a small value. With ECC, one must use a hybrid encryption model such as the Integrated Encryption Scheme (IEC), so a key must be shared separately from the encrypted data. PYELLIPTIC™ also includes a SHA-256 HMAC of the ECC keyshare and encrypted data to ensure integrity of the message (which is standard practice in IEC). Because the message already includes an HMAC, 256 bits (or 15% of the cached certificate handshake) can be saved by including the HMAC of the ECC share into the message HMAC.

Example 1

A prototype was constructed and tested to prove the concepts of the present invention. In particular, the error performance of a modem embodiment across several audio codecs was characterized, the resulting actual throughput was computed after layer 2 effects were taken into account, and the end-to-end timing of complete handshakes were measured.

The prototype implementation consisted of software implementing the protocol, link layer, and modem running on commodity PCs. While embodiments of the present invention can be implemented as a stand-alone embedded device or in telephone hardware/software, a PC served as an ideal prototyping platform for evaluation.

A protocol according to an embodiment of the present invention was implemented in PYTHON™ using the PYTELLEPTIC™ library for cryptography. The link layer was also implemented using PYTHON™. The modem was written in MATLAB™, and that code is responsible for modulating data, demodulating data, and sending and receiving samples over the voice channel. A PYTHON™ Engine was used for MATLAB™ to integrate the modem with PYTHON™. The choice of MATLAB™ facilitated rapid prototyping and development of the modem, but the MATLAB™ runtime placed a considerable load on the PCs running the prototype. Accordingly, computation results, while already acceptable, should improve for embedded implementations.

The modem and handshake were evaluated using software audio channels configured to use one of three audio codecs: G.711 (m-law), Adaptive MultiRate Narrow Band (AMR-NB), and SPEEX™. These particular codecs are among the most common codecs used for landline audio compression, cellular audio, and VoIP audio, respectively. The sox implementations of G.711 and AMR-NB and the ffmpeg implementation of SPEEX™ were used. Software audio channels were used to provide a common baseline of comparison, as no VoIP client or cellular device supports all of these codecs.

As link layer performance depends only on the bit error characteristics of the modem, the link layer using a software loopback with tunable loss characteristics was evaluated instead of a voice channel. This allowed for full and reproducible testing and evaluation of the link layer. The most important characteristic of the modem is its resistance to bit errors. To measure bit error, 100 frames of 2000 random bits each were transmitted and the bit error was measured after reception.

Table 3 shows the average and standard deviation of the bit error for various codecs. The modem saw no bit errors on the G.711 channel. This is reflective of the fact that G.711 is high-quality channel with very minimal processing and compression. AMR-NB and SPEEX™ both saw minimal bit error as well, though SPEEX™ had a much higher variance in errors. SPEEX™ had such a high variance because one frame was truncated, resulting in a higher average error despite the fact the other 99 frames were received with no error.

TABLE 5

| Handshake completion times | | |
|---|---|---|
| Codec | Cached Certificate | Certificate Exchanged |
| G.711 | 4.463 s (0.000) | 8.279 s (0.000) |
| AMR-NB | 5.608 s (0.776) | 10.374 s (0.569) |
| Speex | 4.427 s (0.000) | 8.279 s (0.000) |
| Average | 4.844 s | 8.977 s |

The most important characteristic of the link layer is its ability to optimize goodput—the actual amount of application data transmitted per unit time (removing overhead from consideration). Table 4 shows transmission time as a function of bit error and goodput of the protocol compared to the theoretical optimal transmission time and goodput. The optimal numbers are computed from the optimal bit time (at 500 bits per second) plus 40 ms of header and footer. The experimental numbers are the average of transmission of 50 messages with 2000 bits each. The table shows that, in spite of high bit error rates (up to 2%), the link layer is able to complete message transmission. Of course, the effect of bit errors on goodput is substantial at larger rates. Fortunately, low bit error rates (e.g. 0.1%) result in a minor penalty to goodput—only 5 bps lower than the optimal rate. Higher rates have a more severe impact, resulting in 65.8% and 34.7% of optimal goodput for 1% and 2% loss. Given our observations of bit error rates at less than 0.5% for all codecs, these results demonstrate that our Link Layer retransmission parameters are set within an acceptable range.

To evaluate the complete handshake, the complete time from handshake start to handshake completion was measured from the verifier's perspective. Both variants of the handshake were evaluated—with and without the prover sending a certificate. Handshakes requiring a certificate exchange will generally take much longer than handshakes without a certificate. This is a natural consequence of simply sending more data.

Table 5 shows the total handshake times for calls over each of the three codecs. These results are over 10 calls each. Note that these times are corrected to remove the effects of instrumentation delays and artificial delays caused by inter process communication (IPC) among the different components of the prototype.

From the verifier perspective, the cached certificate exchanges were quite fast—averaging 4.844 seconds across all codecs. When certificates are not cached, the overall average time was 8.977 seconds. Differences in times taken for certificate exchanges for different codecs are caused by the relative underlying bit error rate of each codec. G.711 and SPEEX™ have much lower error rates than AMR-NB, resulting in a lower overall handshake time. In fact, because those codecs saw no errors during the tests, their execution times were virtually identical.

Most of the time spent in the handshake was spent in transmitting messages over the voice channel. In fact, transmission time accounted for 99% of the handshake time.

Computation and miscellaneous overhead averaged to less than 50 milliseconds for all messages. This indicates that the protocol embodiment was computationally minimal and can be implemented on a variety of platforms.

Up until this point, the discussion has focused around strong authentication of one party in the phone call (i.e., the Prover). However, clients already engage in a weaker "application-layer" authentication when talking to many call centers. For instance, when calling a financial institution or ISP, users enter their account number and additional values including PINs and social security numbers. Without one final step, the assumed threat model would allow for an adversary to successfully steal such credentials. For example, an adversary can launch a 3-Way call to both the victim client and the targeted institution. After passively observing the successful handshake, the adversary could capture the client's credentials (i.e., DTMF tone inputs) and hang up both ends of the call. The adversary could then call the targeted institution back spoofing the victim's Caller ID and present the correct credentials.

One of the advantages of TLS is that it allows for the generation of multiple session keys, for use not only in continued authentication, but also in the protection of data confidentiality and integrity. The proposed protocol suggested to be incorporated in embodiments of the present invention is no different. While the data channel enabled by the proposed modem is not very wide, it is sufficiently large enough to carry encrypted copies of client credentials. Accordingly, an adversary attempting to execute the above attack would be unable to do so successfully because this sensitive information could easily be passed through the proposed protocol (and therefore useless in a second session). Moreover, because users are already accustomed to entering such information when interacting with these entities, the user experience could continue without any observable difference.

One of the most significant problems facing SSL/TLS is its trust model. X.509 certificates are issued by a vast number of Certificate Authorities (CAs), whose root certificates can be used to verify the authenticity of a presented certificate. Unfortunately, the unregulated nature of who can issue certificates to whom (i.e., what authority does X have to verify and bind names to entity Y?) and even who can act as a CA have been known since the inception of the current Public Key Infrastructure. This weakness has led to a wide range of attacks, and enabled both the mistaken identity of domain owners and confusion as to which root-signed certificate can be trusted. Traditional certificates present another challenge in this environment—the existence of long verification chains in the presence of the bitrate limited audio channel means that the blind adoption of the Internet's traditional PKI model will likely fail if applied to telephony systems. As demonstrated in the experiment in Table 1, transmitting the entirety of long certificate chains would be detrimental to the performance of the proposed protocol.

The structure of telephony networks leads to a natural, single rooted PKI system. Competitive Local Exchange Carriers (CLECs) are assigned blocks of phone numbers by the NORTH AMERICAN NUMBERING PLAN ASSOCIATION™ (NANPA™), and ownership of these blocks is easily confirmed through publicly posted resources such as NPA/NXX databases in North America. A similar observation was recently made in the secure Internet routing community, and resulted in the proposal of the Resource Public Key Infrastructure (RPKI) [44]. The advantage to this approach is that because all allocation of phone numbers is conducted under the ultimate authority of NANPA™, all valid signatures on phone numbers must ultimately be rooted in a NANPA™ certificate. This Telephony Public Key Infrastructure (TPKI) reduces the length of certificate chains and allows for easy storage of the root and all CLEC certificates in the US and associated territories (≈700) in just over 100 KiB of storage (1600 bits per certificate ≈700). Alternatively, if certificates are only needed for toll free numbers, a single certificate for the company that administers all such numbers (i.e., Somos, Inc.) would be sufficient.

Figure 6:
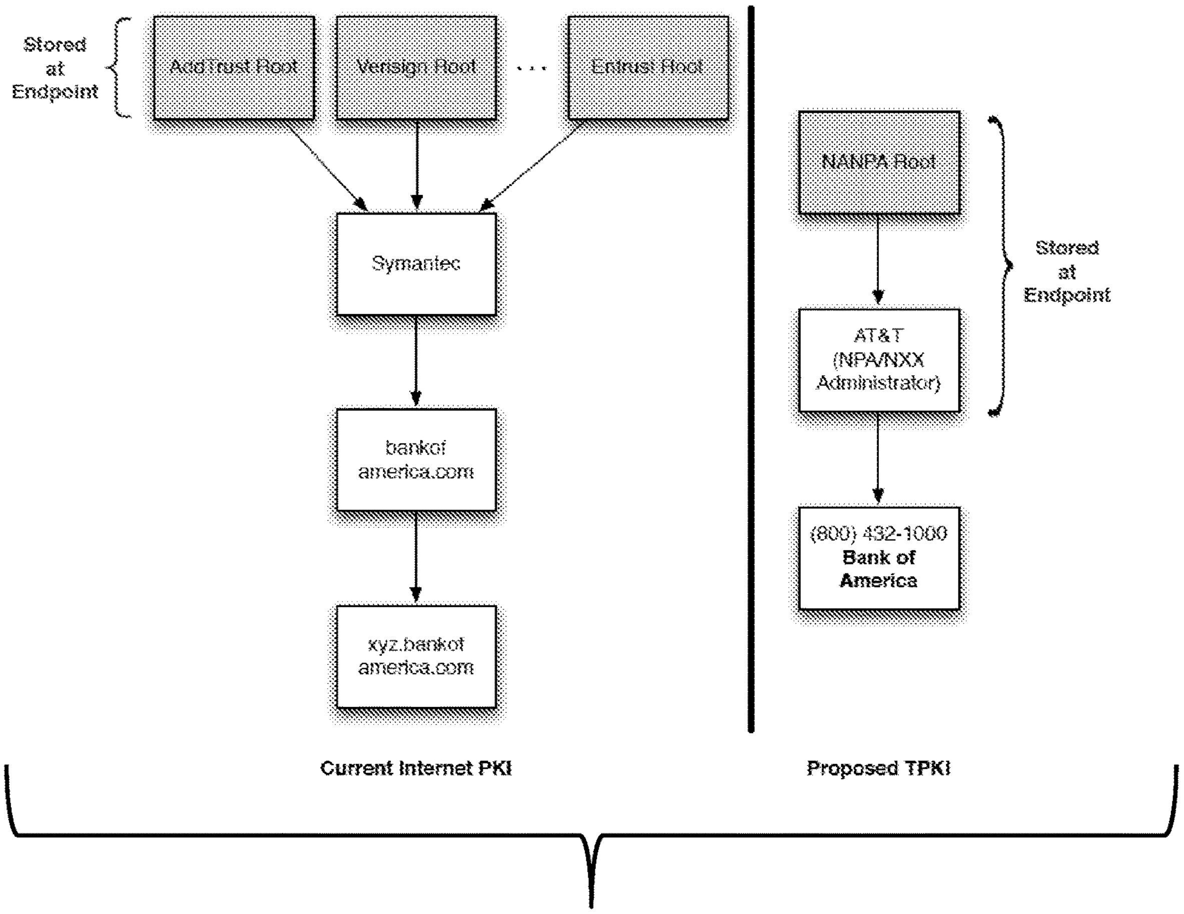
FIG. 6 is a diagram of the Telephony Public Key Infrastructure (TPKI).

FIG. 6 shows the advantages of an approach according to an embodiment of the present invention. Unlike an Internet model, the proposed TPKI has a single root (NANPA) that is responsible for all block allocation, and a limited second level of CLECs who administer specific numbers. Accordingly, only the certificate for the number claimed in the current call needs to be sent during the handshake. Communicating with a specific server (xyz.BANKOFAMERICA™.com) may require the transmission of three or more certificates before identity can be verified. Additionally, the existence of different roots adds confusion to the legitimacy of any claimed identity. The proposed TPKI relies on a single NANPA™ root, and takes advantage of the relatively small total number of CLECs to require only a single certificate for the calling number to be transmitted during the handshake.

Experiments demonstrate that the embodiments of the present invention are bandwidth and not processor bound, and these techniques can be deployed successfully across a wide range of systems. For instance, embodiments of the present invention can be embedded directly into new handset hardware. Moreover, embodiments of the present invention can be used immediately with legacy equipment through external adapters (e.g., RASPBERRY PI). Alternatively, embodiments of the present invention can be loaded onto mobile devices through a software update to the dialer, enabling large numbers of devices to immediately benefit.

Full deployments have the opportunity to make audio signaling almost invisible to the user. If an embodiment of the present invention is in-line with the call audio, the system can remove transmissions from the audio sent to the user. In other words, users will never hear the handshakes or keep-alive messages. While the focus in developing the present invention was to minimize the volume of the signaling to not interrupt a conversation (as has been done in other signaling research), it is suggested that the in-line approach will ultimately provide the greatest stability and least intrusive user experience. Last, it should be noted that because embodiments of the present invention are targeted across all telephony platforms, a range of security indicators may be necessary for successfully communicating authenticated identity to the user, which can be incorporated into the embodiments of the present invention.

Certain challenges facing the development of the present invention have been discussed throughout this application. Solutions are given for overcoming these challenges. However, these solutions are only one way of implementing the present invention and are not intended to limit the present invention's scope. For example, headers and footers can be implemented with different lengths of time, the link layer can be altered, data bits for frames and sub-frames can be changed, a different security protocol can be chosen, a different modulation scheme can be chosen, and alternative software can be used for development, all of which may fall within the contours of the present invention as outlined in the appended claims, below.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processer reads and executes the code and/or data stored on a computer-readable medium, the computer system and/or processer performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1. A method for providing cryptographic authentication within a voice channel.

Embodiment 2. The method of embodiment 1, wherein the method comprises providing an in-band modem that is suitable for executing a TLS-based authentication protocol.

Embodiment 3. The method of any of embodiments 1-2, wherein the method is suitable for operating over heterogeneous networks.

Embodiment 4. The method of any of embodiments 1-3, wherein the method is suitable for providing end-to-end validation of Caller ID.

Embodiment 5. The method of any of embodiments 1-4, wherein the method does not require a secondary data channel.

Embodiment 6. The method of any of embodiments 1-5, wherein the method comprises providing a codec agnostic modem that is suitable for data transmission across audio channels.

Embodiment 7. The method of any of embodiments 1-6, wherein the method comprises providing a Layer 2 protocol suitable for enabling reliable delivery of data across a heterogeneous landscape of telephony networks.

Embodiment 8. The method of any of embodiments 1-7, wherein the method is suitable for authentication of a Prover.

Embodiment 9. The method of any of embodiments 1-8, wherein the method is suitable for authentication of a Verifier.

Embodiment 10. The method of any of embodiments 1-9, wherein the method is suitable for operating over G.711/PCMu, AMR and SPEEX™ codes.

Embodiment 11. The method of any of embodiments 1-10, wherein the method is suitable for creating a data channel with a goodput of 500 bps or more and a bit error rate averaging below 0.5%

Embodiment 12. The method of any of embodiments 1-11, wherein the method is suitable for running in an average of 10 seconds or less.

Embodiment 13. The method of any of embodiments 1-12, wherein the method is suitable for operating over mobile, PSTN, and VOIP networks.

Embodiment 14. The method of any of embodiments 1-13, wherein the method comprises providing a modem that operates using frequency-shift modulation, operates within a frequency range of 300-3400 Hz, operates using decoherent modulation (with chosen frequencies that are separated by at least the symbol transmission rate), and operates with each frequency being an integer multiple of a symbol frequency.

Embodiment 15. The method of any of embodiments 1-14, wherein the method comprises providing a modem that operates using a 3-FSK system.

Embodiment 16. The method of any of embodiments 1-15, wherein the method comprises providing a modem that operates using a 3-FSK system transmitting symbols at about (about can mean plus or minus 20%, or an equivalent range of frequencies) 1000 Hz using frequencies of about 1000, about 2000, and about 3000 Hz.

Embodiment 17. The method of any of embodiments 1-16, wherein the method comprises providing a modem that operates using differential modulation, wherein bits are encoded by a relative difference between two consecutive symbols.

Embodiment 18. The method of any of embodiments 1-17, wherein the method comprises sending a header with each packet.

Embodiment 19. The method of any of embodiments 1-18, wherein the method comprises sending a footer after each packet.

Embodiment 20. The method of any of embodiments 1-19, wherein the method comprises sending the header with each packet, wherein the header operates at a frequency that is orthogonal to the transmission frequencies.

Embodiment 21. The method of any of embodiments 1-20, wherein the method comprises computing the energy of a short sliding window to distinguish between silence and a transmission.

Embodiment 22. The method of any of embodiments 1-21, wherein the method comprises a link layer that manages error detection, error correction, frame acknowledgement, retransmission, and reassembly of fragmented messages.

Embodiment 23. The method of any of embodiment 1-22, wherein link layer chunks transmitted frames into blocks suitable for being checked and retransmitted if lost.

Embodiment 24. The method of any of embodiments 1-23, wherein the blocks each include data and a CRC.

Embodiment 25. The method of any of embodiments 1-24, wherein when a message is received by a receiver, an acknowledgement frame is sent back to the transmitter.

Embodiment 26. The method of any of embodiments 1-25, wherein the acknowledgement frame comprises a single bit.

Embodiment 27. The method of any of embodiment 1-26, wherein negatively acknowledged blocks are retransmitted.

Embodiment 28. The method of any of embodiments 1-27, wherein redundant ACK data is sent within each frame.

Embodiment 29. The method of any of embodiments 1-28, wherein the header is sent multiple times.

Embodiment 30. The method of any of embodiments 1-29, wherein the prover has a certificate issued by a service provider.

Embodiment 31. The method of any of embodiments 1-30, wherein the prover and the verifier demonstrate they remain on a call throughout the call's duration.

Embodiment 32. The method of any of embodiments 1-31, wherein either the prover or verifier can initiate the call, and wherein a protocol begins immediately after a call is terminated, and the protocol comprises:

- the verifier transmitting its identity and a nonce to the prover;
- the prover transmitting a nonce and a certificate and signing contents of a message to bind the nonce to the prover's identity, wherein the provers identity is transmitted via Caller ID and within the certificate;
- the verifier transmitting a pre-master secret and using the pre-master secret to generate a session K;
- the verifier extracting the prover's public key from the certificate, encrypting the pre-master secret using the prover's public key, and then computing HMAC;
- the verifier sending the pre-master secret and the HMAC to the prover; and
- the prover decrypting the pre-master secret and using the pre-master secret to calculate the session key, and then computing HMAC.

Embodiment 33. The method of any of embodiments 1-32, wherein the certificates comprise:

a protocol version, a prover's phone number, claimed identification, a validity period, a unique certificate identification number, and the certificate owner's ECC public key and a signature.

Embodiment 34. The method of any of embodiments 1-33, wherein the method operates using a standard handshake.

Embodiment 35. The method of any of embodiments 1-34, wherein the method operates using a verifier-cached certificate.

Embodiment 36. The method of any of embodiments 1-35, wherein the HMAC of the ECC share is included in the message HMAC.

Embodiment 37. The method of any of embodiments 1-36, wherein the method is implemented using a stand-alone embedded device.

Embodiment 38. The method of any of embodiments 1-37, wherein the method is implemented in telephonic hardware or software.

Embodiment 39. The method of any of embodiments 1-38, wherein the method is run below speaker audio such that it does not interfere with call participant conversations.

Embodiment 40. The method of any of embodiments 1-39, wherein the method operates between telephonic systems.

Embodiment 41. The method of any of embodiments 1-40, wherein the method operates solely within the voice channel.

Embodiment 42. The method of any of embodiments 1-39, wherein the method operates using a combination of the voice channel and another data channel.

Embodiment 101. A telephonic apparatus suitable for providing cryptographic authentication within a voice channel.

Embodiment 102. The telephonic apparatus of embodiment 101, wherein the telephonic apparatus comprises a codec agnostic modem that is suitable for data transmission across audio channels.

Embodiment 103. The telephonic apparatus of embodiments 101-102, wherein the modem operates using frequency-shift modulation, operates within a frequency range of 300-3400 Hz, operates using decoherent modulation (with chosen frequencies that are separated by at least the symbol transmission rate), and operates with each frequency being an integer multiple of a symbol frequency.

Embodiment 104. The telephonic apparatus of any of embodiments 101-103, wherein the modem operates using a 3-FSK system.

Embodiment 105. The telephonic apparatus of any of embodiments 101-104, wherein the modem operates using differential modulation, wherein bits are encoded by a relative difference between two consecutive symbols.

Embodiment 106. The telephonic apparatus of any of embodiments 101-105, wherein the telephonic apparatus is suitable for operating over heterogeneous networks.

Embodiment 107. The telephonic apparatus of any of embodiments 101-106, wherein the telephonic apparatus is suitable for operating over G.711/PCMu, AMR and SPEEX™ codes.

Embodiment 108. The telephonic apparatus of any of embodiments 101-107, wherein the telephonic apparatus is suitable for operating over mobile, PSTN, and VOIP networks.

Embodiment 109. The telephonic apparatus of any of embodiments 101-108, wherein the telephonic apparatus is suitable for providing end-to-end validation of Caller ID.

Embodiment 110. The telephonic apparatus of any of embodiments 101-109, wherein the telephonic apparatus is suitable for providing end-to-end validation of Caller ID.

Embodiment 111. The telephonic apparatus of any of embodiments 101-110, wherein the telephonic apparatus is suitable for authentication of a Prover and a Verifier.

Embodiment 112. The telephonic apparatus of any of embodiments 101-111, wherein the telephonic apparatus is suitable for creating a data channel with a goodput of 500 bps or more and a bit error rate averaging below 0.5%

Embodiment 113. The telephonic apparatus of any of embodiments 101-112, wherein the cryptographic authentication averages 10 seconds or less.

Embodiment 114. The telephonic apparatus of any of embodiments 101-113, wherein the telephonic apparatus is suitable for demonstrating that the verifier and the prover remain on a call throughout the call's duration.

Embodiment 115. The telephonic apparatus of any of embodiments 101-114, wherein the cryptographic authentication is implemented using a stand-alone embedded device.

Embodiment 116. The telephonic apparatus of any of embodiments 101-115, wherein the cryptographic authentication is implemented in telephonic hardware or software.

Embodiment 117. The telephonic apparatus of any of embodiments 101-116, wherein the cryptographic authentication operates below speaker audio such that it does not interfere with call participant conversations.

Embodiment 118. The telephonic apparatus of any of embodiments 101-117, wherein the modem is an in-band modem that is suitable for executing a TLS-based authentication protocol.

Embodiment 119. The telephonic apparatus of any of embodiments 101-118, wherein the telephonic apparatus is suitable for operating (and/or configured to operate) solely within the voice channel.

Embodiment 120. The telephonic apparatus of any of embodiments 101-119, wherein the telephonic apparatus is suitable for operating (and/or configured to operate) using a combination of the voice channel and another data channel.

Embodiment 201. A method for providing cryptographic authentication with a voice channel, the method compromising:

a verifier transmitting its identity and a nonce to a prover;

the prover transmitting a nonce and a certificate and signing contents of a message to bind the nonce to a prover's identity, wherein the prover's identity is transmitted within the certificate; and the verifier and the prover establishing a shared cryptographic key using the Diffie-Helman protocol.

Embodiment 202. The method of embodiment 201, wherein all data is transmitted over a voice channel.

Embodiment 203. The method of any of embodiments 201-202, wherein the method further comprises applying a frequency-shift keying (FSK) frequency modulation scheme.

Embodiment 204. The method of any of embodiments 201-203, wherein the method further comprises providing a modem that operates using a 3-FSK system transmitting symbols at about 1000-Hz using frequencies of about 1000-, 2000-, and 3000-Hz.

Embodiment 205. The method of any of embodiments 201-204, wherein the method operates using a combination of the voice channel and another data channel.

Embodiment 206. The method of any of embodiments 201-205, wherein the method is run below speaker audio such that it does not interfere with call participant conversations.

Embodiment 207. The method of any of embodiments 201-206, wherein the method further comprises providing a modem that operates using differential modulation, and wherein bits are encoded by a relative difference between two consecutive symbols.

Embodiment 208. The method of any of embodiments 201-207, wherein the method is implemented in telephonic hardware or software.

Embodiment 209. The method of any of embodiments 201-208, wherein the method is implemented using a stand-alone embedded device.

Embodiment 210. The method of any of embodiments 201-209, wherein the certificate includes a protocol version, a prover's phone number, claimed identification, a validity period, a unique certificate identification number, and a certificate owner's elliptic curve cryptography (ECC) public key, and a signature.

Embodiment 211. The method of any of embodiments 201-210, wherein the prover and the verifier demonstrate they remain on a call throughout the call's duration.

Embodiment 212. The method of any of embodiments 201-211, wherein the prover has a certificate issued by a service provider.

Embodiment 213. The method of any of embodiments 201-212, wherein redundant acknowledgement data is sent within each frame.

Embodiment 214. The method of any of embodiments 201-213, wherein data is sent in frames having blocks, each of which includes data and a CRC.

Embodiment 215. The method of any of embodiments 201-214, wherein all data is transmitted over a voice channel and between 300-3400 Hz.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] RedPhone::Private Calls—Android Apps on Google Play https://play.google. com/store/apps/details?id=org. thoughtcrime.redphone{\&}hl=en.

[2] Directory of Unknown Callers. http://www.800notes.com/, 2015.

[3] GSMK CryptoPhone. http://www.cryptophone.de/en/, 2015.

[4] Homepage—Silent Circle. https://www.silentcircle-.com/, 2015.

[5] PGPfone—Pretty Good Privacy Phone. http://www.pg-pi.org/products/pgpfone/, 2015.

[6] Signal—Private Messenger on the App Store. https://itunes.apple.com/us/app/signal-private-messenger/id874139669?mt=8, 2015.

[7] Stop robocalls and telemarketers with Nomorobo. https://www.nomorobo.com/,2015.

[8] ffmpeg. https://www.ffmpeg.org, 2016.

[9] Pyelliptic. https://pypi.python.org/pypi/pyelliptic, 2016.

[10] sox. http://sox.sourceforge.net/Main/HomePage, 2016.

[11] 3rd Generation Partnership Project. A Guide to $3^{rd}$ Generation Security. Technical Report 33.900 version 1.2.0, 2000.

[12] 3rd Generation Partnership Project. 3G Security Principles and Objectives (3GPP TS 33.120). 2001.

[13] 3rd Generation Partnership Project. 3GPP TS 23.228 IP Multimedia Subsystem (IMS). (Release 11), 2012.

[14] D. Akhawe, B. Amann, M. Vallentin, and R. Sommer. Here's My Cert, So Trust Me, Maybe? Understanding TLS Errors on the Web. In Proceedings of the 22Nd International Conference on World Wide Web (WWW), pages 59-70, 2013.

[15] D. Akhawe and A. P. Felt. Alice in warningland: A large-scale field study of browser security warning effectiveness. In Proceedings of the USENIX conference on Security (SEC), 2013.

[16] F. Alegre, G. Soldi, and N. Evans. Evasion and obfuscation in automatic speaker verification. In Proceedings of the IEEE International Conference on Acoustics, Speech and Signal Processing (ICASSP), pages 749-753, 2014.

[17] F. Alegre and R. Vipperla. On the vulnerability of automatic speaker recognition to spoofing attacks with artificial signals. In Proceedings of the 20th European Signal Processing Conference (EUSIPCO), pages 36-40, 2012.

[18] Andreas Tyrberg. Data Transmission over Speech Coded Voice Channels. Master's Thesis, Linkoping University, 2006.

[19] V. Balasubramaniyan, A. Poonawalla, M. Ahamad, M. Hunter, and P. Traynor. PinDrOp: Using Single-Ended Audio Features to Determine Call Provenance. In Proceedings of the ACM Conference on Computer and Communications Security (CCS), 2010.

[20] E. Barkan, E. Biham, and N. Keller. Instant ciphertext-only cryptanalysis of GSM encrypted communication. Journal of Cryptology, 21(3):392-429, 2008.

[21] A. Bates, J. Pletcher, T. Nichols, B. Hollembaek, and K. R. Butler. Forced Perspectives: Evaluating an SSL Trust Enhancement at Scale. In Proceedings of the 2014 Conference on Internet Measurement Conference (IMC), pages 503-510. ACM, 2014.

[22] M. Bellare. New Proofs for NMAC and HMAC Security without Collision-Resistance. Advances in Cryptology—CRYPTO '06, 2006.

[23] Bernard Sklar. Digital Communications: Fundamentals and Applications. Prentice Hall, Upper Saddle River, N.J., 2 edition edition, January 2001.

[24] B. Blanchet. ProVerif: Cryptographic protocol verifier in the formal model. http://www.proverif.ens.fr/, 2016.

[25] H. K. Bokharaei, A. Sahraei, Y. Ganjali, R. Keralapura, and A. Nucci. You can SPIT, but you can't hide: Spammer identification in telephony networks. In Proceedings of the IEEE INFOCOM, pages 41-45, 2011.

[26] R. Bresciani, S. Superiore, S. Anna, and I. Pisa. The ZRTP Protocol Security Considerations. Technical Report LSV-07-20, 2007.

[27] Y. J. Choi and S. J. Kim. An Improvement on Privacy and Authentication in GSM. In Proceedings of Workshop on Information Security Applications (WISA), 2004.

[28] J. Clark and P. C. Van Oorschot. SoK: SSL and HTTPS: Revisiting past challenges and evaluating certificate trust model enhancements. In Proceedings of the IEEE Symposium on Security and Privacy (S&P), pages 511-525, 2013.

[29] Communications Fraud Control Association (CFCA). 2013 Global Fraud Loss Survey. http://www.cvidya.com/media/62059/global-fraud loss survey2013.pdf, 2013.

[30] I. Dacosta, M. Ahamad, and P. Traynor. Trust No One Else: Detecting MI™ Attacks Against SSL/TLS Without Third-Parties. In Proceedings of the European Symposium on Research in Computer Security (ESORICS), 2012.

[31] R. Dhamija, J. D. Tygar, and M. Hearst. Why phishing works. In Proceedings of the SIGCHI conference on Human Factors in Computing Systems (CHI), CHI '06, New York, N.Y., USA, 2006. ACM.

[32] A. Dhananjay, A. Sharma, M. Paik, J. Chen, T. K. Kuppusamy, J. Li, and L. Subramanian. Hermes: Data Transmission over Unknown Voice Channels. In Proceedings of the Sixteenth Annual International Conference on Mobile Computing and Networking, MobiCom, New York, N.Y., USA, 2010. ACM.

[33] Z. Durumeric, J. Kasten, D. Adrian, J. A. Halderman, M. Bailey, F. Li, N. Weaver, J. Amann, J. Beekman, M. Payer, and V. Paxson. The Matter of Heartbleed. In Proceedings of the 2014 Conference on Internet Measurement Conference (IMC), pages 475-488, New York, N.Y., USA, 2014. ACM.

[34] S. Egelman, L. F. Cranor, and J. Hong. You've been warned: An empirical study of the effectiveness of web browser phishing warnings. In Proceedings of the SIGCHI Conference on Human Factors in Computing Systems (CHI), 2008.

[35] C. Ellison, B. Frantz, B. Lampson, R. L. Rivest, B. Thomas, and T. Ylonen. SPKI Certificate Theory. IETF, RFC 2693, 1999.

[36] C. Ellison and B. Schneier. Ten Risks of PKI: What Youre not Being Told about Public Key Infrastructure. Computer Security Journal, 16(1):1-7, 2000.

[37] R. Holz, L. Braun, N. Kammenhuber, and G. Carle. The SSL landscape: a thorough analysis of the x.509 PKI using active and passive measurements. In Proceedings of the 2011 ACM SIGCOMM conference on Internet Measurement Conference (IMC), pages 427-444, 2011.

[38] L. S. Huang, A. Rice, E. Ellingsen, and C. Jackson. Analyzing Forged SSL Certificates in the Wild. In Proceedings of the IEEE Symposium on Security and Privacy (SP), 2014.

[39] N. Jiang, Y. Jin, A. Skudlark, W.-L. Hsu, G. Jacobson, S. Prakasam, and Z.-L. Zhang. Isolating and analyzing fraud activities in a large cellular network via voice call graph analysis. In Proceedings of the 10th international conference on Mobile systems, applications, and services (MobiSys), page 253, 2012.

[40] Q. Jin, A. R. Toth, A. W. Black, and T. Schultz. Is voice transformation a threat to speaker identification? In Proceedings of the International Conference on Acoustics, Speech and Signal Processing (ICASSP), pages 4845-4848. IEEE, 2008.

[41] N. N. Katugampala, K. T. Al-Naimi, S. Villette, and A. M. Kondoz. Real-time end-to-end secure voice communications over GSM voice channel. Signal Processing Conference, 2005 13th European, pages 1-4, 2005.

[42] P. Koopmans and T. Chakravarty. Cyclic redundancy code (CRC) polynomial selection for embedded networks. In 2004 International Conference on Dependable Systems and Networks, pages 145-154, June 2004.

[43] C. Lee, M. Hwang, and W. Yang. Enhanced privacy and authentication for the global system for mobile communications. Wireless Networks, 5(4):231-243, 1999.

[44] M. Lepinski, R. Barnes, and S. Kent. An Infrastructure to Support Secure Internet Routing. IETF, RFC 6480, 2012.

[45] T. H. A. C. Liath and R. Bresciani. The ZRTP Protocol Analysis on the Diffie-Hellman Mode Foundations and Methods Research Group, 2009.

[46] Local Search Association. CLEC Information. http://www.thelsa.org/main/clecinformation.aspx, 2016.

[47] B. Mathieu, S. Niccolini, and D. Sisalem. SDRS: A Voice-over-IP Spam Detection and Reaction System. IEEE Security & Privacy Magazine, 6(6):52-59, nov 2008.

[48] B. Moeller and A. Langley. TLS Fallback Signaling Cipher Suite Value (SCSV) for Preventing Protocol Downgrade Attacks. Internet-draft, Internet Engineering Task Force, 2014.

[49] National Institute of Standards and Technology. NIST Special Publication 800-107 Revision 1:Recommendation for Applications Using Approved Hash Algorithms. http://csrc.nist. gov/publications/nistpubs/800-107-rev1/sp800-107-rev1.pdf, 2008.

[50] R. Needham and M. Schroeder. Using encryption for authentication in large networks of computers. Communications of the ACM, 21(12):993-999, 1978.

[51] M. A. Ozkan, B. Ors, and G. Saldamli. Secure voice communication via GSM network. 2011 7$^{th}$ International Conference on Electrical and Electronics Engineering (ELECO), pages 11-288-11-292, 2011.

[52] M. Petraschek, T. Hoeher, O. Jung, H. Hlavacs, and W. Gansterer. Security and usability aspects of Man-in-the-Middle attacks on ZRTP. Journal of Universal Computer Science, 14(5):673-692, 2008.

[53] A. Ramirez. Theft through cellular 'clone' calls. http://www.nytimes.com/1992/04/07/business/theft-through-cellular-clone-calls. html, Apr. 7, 1992.

[54] B. Reaves, E. Shernan, A. Bates, H. Carter, and P. Traynor. Boxed Out: Blocking Cellular Interconnect Bypass Fraud at the Network Edge. In Proceedings of the USENIX Security Symposium (SECURITY), 2015.

[55] E. Rescorla. SSL and TLS: Designing and Building Secure Systems. Addison-Wesley, 2001.

[56] C. Research. SEC 2: Recommended Elliptic Curve Domain Parameters, January 2010.

[57] R. Rivest and B. Lampson. SDSI: A Simple Distributed Security Infrastructure. http://research.microsoft.com/en-us/um/people/blampson/59-sdsi/webpage.html,1996.

[58] S. Rosset, U. Murad, E. Neumann, Y. Idan, and G. Pinkas. Discovery of Fraud Rules for Telecommunications-Challenges and Solutions. In Proceedings of the Fifth ACM SIGKDD International Conference on Knowledge Discovery and Data Mining (KDD), pages 409-413, New York, N.Y., USA, 1999.

[59] D. Samfat, R. Molva, and N. Asokan. Untraceability in mobile networks. In Proceedings of the 1st annual international conference on Mobile computing and networking (MobiCom), pages 26-36, 1995.

[60] S. E. Schechter, R. Dhamija, A. Ozment, and I. Fischer. The emperor's new security indicators In Proceedings of the IEEE Symposium on Security and Privacy (SP), 2007.

[61] H. Sengar. VoIP Fraud: Identifying a Wolf in Sheeps Clothing. In Proceedings of the 2014 ACM SIGSAC Conference on Computer and Communications Security (CCS), pages 334-345, 2014.

[62] M. Sherr, E. Cronin, S. Clark, and M. Blaze. Signaling Vulnerabilities in Wiretapping Systems. IEEE Security & Privacy Magazine, 3(6):13-25, November 2005.

[63] M. Shirvanian and N. Saxena. Wiretapping via Mimicry: Short Voice Imitation Man-in-the-Middle Attacks on Crypto Phones. In Proceedings of the 2014 ACM SIGSAC Conference on Computer and Communications Security (CCS), pages 868-879, 2014.

[64] J. Sobey, R. Biddle, P. van Oorschot, and A. S. Patrick. Exploring User Reactions to New Browser Cues for Extended Validation Certificates. In Proceedings of the European Symposium on Research in Computer Security (ESORICS), 2008.

[65] Y. Stylianou. Voice Transformation: A survey. In Proceedings of the IEEE Conference on Acoustics, Speech and Signal Processing (ICASSP), 2009.

[66] TelTech. Caller ID Spoofing, Voice Changing & Call Recording—Prank Calls—SpoofCard. http://www.spoofcard.com/, 2015.

[67] M. Toorani and A. Beheshti. Solutions to the GSM SecurityWeaknesses. In Proceedings of the Second International Conference on Next Generation Mobile Applications, Services, and Technologies (NGMAST), pages 576-581, 2008.

[68] P. Traynor, P. McDaniel, and T. La Porta. Security for Telecommunications Networks. Number 978-0-387-72441-6 in Advances in Information Security Series. Springer, August 2008.

[69] Z. Wu, A. Khodabakhsh, C. Demiroglu, J. Yamagishi, D. Saito, T. Toda, and S. King. SAS: A speaker verification spoofing database containing diverse attacks. In Proceedings of the IEEE International Conference on Acoustics, Speech and Signal Processing (ICASSP), pages 4440-4444, apr 2015.

[70] Z. Wu and H. Li. Voice conversion and spoofing attack on speaker verification systems. In Proceedings of the Asia-Pacific Signal and Information Processing Association Annual Summit and Conference (APSIPA). IEEE, 2013.

[71] P. Zimmermann. Zfone Project Home Page. http://zfoneproject.com/, 2015.

[72] P. Zimmermann and A. Johnston. ZRTP: Media Path Key Agreement for Unicast Secure RTP. IETF, RFC 6189, 2011.

[73] T. Zoller. TLS & SSLv3 Renegotiation Vulnerability. http://www.g-sec.lu/practicaltls.

What is claimed is:

1. A method for providing cryptographic authentication within a voice channel, the method comprising:

transmitting a first message to a prover, the first message comprising a verifier identity and a verifier nonce;

receiving a second message originating from the prover, the second message comprising a prover nonce and a certificate originating from the prover, wherein the certificate comprises a prover identity and a signature generated by the prover to bind the prover nonce to the prover identity;

generating a session key based at least in part on generating a pre-master secret;

transmitting an encrypted pre-master secret and a first keyed-hash message authentication code (HMAC) to the prover, wherein the encrypted pre-master secret is generated based at least in part on the pre-master secret and a prover public key extracted from the certificate, and wherein the HMAC is generated based at least in part on the session key, the first message, and the second message;

receiving a second HMAC originating from the prover; and determining whether to authenticate or reject the prover identity in the certificate based at least in part on the second HMAC.

2. The method of claim 1, further comprising determining whether the prover remains on a call based at least in part on receiving one or more subsequent HMACs originating from the prover during a duration of the call.

3. The method of claim 2, wherein the one or more subsequent HMACs originating from the prover are generated based at least in part on one or more incrementing prover nonces.

4. The method of claim 1, wherein the second HMAC originating from the prover is generated based at least in part on a decryption of the encrypted pre-master secret to determine the pre-master secret and a determination of the session key using the pre-master secret.

5. The method of claim 1, wherein at least the first message, the encrypted pre-master secret, and the first HMAC are transmitted over the voice channel, and wherein at least the second message and the second HMAC are received over the voice channel.

6. The method of claim 1, further comprising applying a frequency-shift-keying (FSK) frequency modulation scheme.

7. The method of claim 1, wherein the method is performed concurrently and below speaker audio without interfering with call participant conversations.

8. The method of claim 1, wherein the certificate further comprises at least one of a protocol version, a phone number associated with the prover, a validity period, a unique certificate identification number, and an elliptic curve cryptography (ECC) public key associated with an owner of the certificate.

9. The method of claim 1, wherein the certificate is issued by a service provider.

10. The method of claim 1, wherein the method is performed for a heterogenous network, the heterogenous network being a cellular network, Voice over Internet Protocol (VoIP), or a public switched telephone network (PSTN).

11. The method of claim 1, wherein at least the first message, the encrypted pre-master secret, and the first HMAC are transmitted via a modem configured to use a 3-frequency-shift-keying (3-FSK) system to transmit symbols at about 1000-Hz using frequencies of about 1000-Hz, 2000-Hz, and 3000-Hz.

12. The method of claim 11, wherein the modem is configured to use differential modulation to encode bits by a relative difference between two consecutive symbols.

13. The method of claim 11, wherein the modem is configured to transmit data in frames having blocks, each of which include data and a cyclic redundancy check (CRC).

14. The method of claim 11, wherein the modem operates within a frequency range of 300-Hz to 3400-Hz to transmit data over the voice channel.

15. The method of claim 11, wherein the modem is an in-band modem.

16. The method of claim 11, wherein the modem comprises a link layer configured for managing error detection, error correction, frame acknowledgement, retransmission, and reassembly of fragmented messages.

17. The method of claim 16, wherein the link layer is configured to chunk transmitted frames into one or more individual blocks, to determine whether an individual block is lost, and to retransmit the individual block responsive to determining that the individual block is lost.

18. The method of claim 1, wherein the session key comprises a shared cryptographic key generated in accordance with a Diffie-Hellman protocol.

19. An apparatus for providing cryptographic authentication within a voice channel, the apparatus comprising at least one processor and a computer-readable medium having computer-executable code stored thereon, the computer-readable medium and the computer-executable code configured to, with the at least one processor, to cause the apparatus to:

transmit a first message to a prover, the first message comprising a verifier identity and a verifier nonce;

receive a second message originating from the prover, the second message comprising a prover nonce and a certificate originating from the prover, wherein the certificate comprises a prover identity and a signature generated by the prover to bind the prover nonce to the prover identity;

generate a session key based at least in part on generating a pre-master secret;

transmit an encrypted pre-master secret and a first keyed-hash message authentication code (HMAC) to the prover, wherein the encrypted pre-master secret is generated based at least in part on the pre-master secret and a prover public key extracted from the certificate, and wherein the HMAC is generated based at least in part on the session key, the first message, and the second message;

receive a second HMAC originating from the prover; and determine whether to authenticate or reject the prover identity in the certificate based at least in part on the second HMAC.

20. The apparatus of claim 19, wherein the computer-readable medium and the computer-executable code are further configured to, with the at least one processor, cause the apparatus to determine whether the prover remains on a call based at least in part on receiving one or more subsequent HMACs originating from the prover during a duration of the call.

21. The apparatus of claim 20, wherein the one or more subsequent HMACs originating from the prover are generated based at least in part on one or more incrementing prover nonces.

22. The apparatus of claim 19, wherein the second HMAC originating from the prover is generated based at least in part on a decryption of the encrypted pre-master secret to determine the pre-master secret and a determination of the session key using the pre-master secret.

23. The apparatus of claim 19, wherein at least the first message, the encrypted pre-master secret, and the first HMAC are transmitted over the voice channel, and wherein at least the second message and the second HMAC are received over the voice channel.

24. The apparatus of claim 19, wherein the computer-readable medium and the computer-executable code are further configured to, with the at least one processor, cause the apparatus to apply a frequency-shift-keying (FSK) frequency modulation scheme.

25. The apparatus of claim 19, wherein at least the determining whether to authenticate or reject the prover identity in the certificate based at least in part on the second HMAC is performed concurrently and below speaker audio without interfering with call participant conversations.

26. The apparatus of claim 19, wherein the session key comprises a shared cryptographic key generated in accordance with a Diffie-Hellman protocol.

27. A non-transitory computer storage medium for providing cryptographic authentication within a voice channel, the non-transitory computer storage medium comprising instructions configured to cause one or more processors to at least perform operations to:

transmit a first message to a prover, the first message comprising a verifier identity and a verifier nonce;

receive a second message originating from the prover, the second message comprising a prover nonce and a certificate originating from the prover, wherein the certificate comprises a prover identity and a signature generated by the prover to bind the prover nonce to the prover identity;

generate a session key based at least in part on generating a pre-master secret;

transmit an encrypted pre-master secret and a first keyed-hash message authentication code (HMAC) to the prover, wherein the encrypted pre-master secret is generated based at least in part on the pre-master secret and a prover public key extracted from the certificate, and wherein the HMAC is generated based at least in part on the session key, the first message, and the second message;

receive a second HMAC originating from the prover; and determine whether to authenticate or reject the prover identity in the certificate based at least in part on the second HMAC.

28. The non-transitory computer storage medium of claim 27, wherein the non-transitory computer storage medium comprises instructions further configured to cause one or more processors to at least perform operations to determine whether the prover remains on a call based at least in part on receiving one or more subsequent HMACs originating from the prover during a duration of the call.

29. The non-transitory computer storage medium of claim 28, wherein the one or more subsequent HMACs originating from the prover are generated based at least in part on one or more incrementing prover nonces.

30. The non-transitory computer storage medium of claim 27, wherein the second HMAC originating from the prover is generated based at least in part on a decryption of the encrypted pre-master secret to determine the pre-master secret and a determination of the session key using the pre-master secret.

31. The non-transitory computer storage medium of claim 27, wherein at least the first message, the encrypted pre-master secret, and the first HMAC are transmitted over the voice channel, and wherein at least the second message and the second HMAC are received over the voice channel.

32. The non-transitory computer storage medium of claim 27, wherein the non-transitory computer storage medium comprises instructions further configured to cause one or more processors to at least perform operations to apply a frequency-shift-keying (FSK) frequency modulation scheme.

33. The non-transitory computer storage medium of claim 27, wherein at least the determining whether to authenticate or reject the prover identity in the certificate based at least in part on the second HMAC is performed concurrently and below speaker audio without interfering with call participant conversations.

34. The non-transitory computer storage medium of claim 27, wherein the session key is a shared cryptographic key generated in accordance with a Diffie-Hellman protocol.

* * * * *